US012569798B2

(12) United States Patent
Lackner et al.

(10) Patent No.: US 12,569,798 B2
(45) Date of Patent: Mar. 10, 2026

(54) DEVICE AND METHOD FOR PASSIVE COLLECTION OF ATMOSPHERIC CARBON DIOXIDE WITH ELECTRO-SWING MATERIALS

(71) Applicant: ARIZONA BOARD OF REGENTS ON BEHALF OF ARIZONA STATE UNIVERSITY, Scottsdale, AZ (US)

(72) Inventors: Klaus Lackner, Longmont, CO (US); Robert Page, Phoenix, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 461 days.

(21) Appl. No.: 18/254,971

(22) PCT Filed: Nov. 30, 2021

(86) PCT No.: PCT/US2021/061171
§ 371 (c)(1),
(2) Date: May 30, 2023

(87) PCT Pub. No.: WO2022/115773
PCT Pub. Date: Jun. 2, 2022

(65) Prior Publication Data
US 2024/0091698 A1 Mar. 21, 2024

Related U.S. Application Data

(60) Provisional application No. 63/119,325, filed on Nov. 30, 2020.

(51) Int. Cl.
*B01D 53/04* (2006.01)
*B01D 53/32* (2006.01)

(52) U.S. Cl.
CPC ..... *B01D 53/0438* (2013.01); *B01D 53/0454* (2013.01); *B01D 53/323* (2013.01);
(Continued)

(58) Field of Classification Search
CPC .... B01D 53/06; B01D 53/323; B01D 53/407; B01D 53/438; B01D 53/454;
(Continued)

(56) References Cited

U.S. PATENT DOCUMENTS 8,500,857 B2 * 8/2013 Eisenberger ....... B01D 53/0407
95/107
8,500,860 B2 * 8/2013 Eisenberger ....... B01D 53/0407
95/107
(Continued)

FOREIGN PATENT DOCUMENTS

WO 2019165151 8/2019
WO 2020092272 5/2020

OTHER PUBLICATIONS

Voskian, Sahag, et al. "Faradaic Electro-Swing Reactive adsorption for CO2 Capture," Energy & Environmental Science 2019, 12, 3530-3547. [retrieved Feb. 8, 2022]. Retrieved from the internet: ; DOI: 10/1039/c9ee02412c (Year: 2019).*
(Continued)

*Primary Examiner* — Jennifer Dieterle
*Assistant Examiner* — Sonji Turner
(74) *Attorney, Agent, or Firm* — FULLER IP LAW LLC; Rodney J. Fuller

(57) ABSTRACT
A system, device, and method for passive collection of atmospheric carbon dioxide is disclosed. The device includes a release chamber having a sorbent regeneration system with a power supply, and a capture structure coupled to the release chamber, having a plurality of disks coupled to and spaced along at least one collapsible support. Each
(Continued)

disk has an electro-swing sorbent material. The capture structure is movable between collection and release configurations. The collection configuration includes the capture structure extending upward to expose the structure to an airflow and allow the sorbent to capture atmospheric carbon dioxide while a collection voltage is established across the sorbent material. The release configuration includes the disks enclosed inside the release chamber and conductively coupled to the power supply such that a release voltage is established across the electro-swing sorbent material, resulting in the release of captured carbon dioxide forming an enriched gas.

20 Claims, 13 Drawing Sheets

(52) U.S. Cl.
CPC .... *B01D 2257/504* (2013.01); *B01D 2258/06* (2013.01); *B01D 2259/40086* (2013.01); *B01D 2259/4009* (2013.01)

(58) Field of Classification Search
CPC ............ B01D 53/462; B01D 2257/504; B01D 2258/06; B01D 2259/4009; B01D 2259/40086
See application file for complete search history.

(56) References Cited

U.S. PATENT DOCUMENTS

| | | | | |
|---|---|---|---|---|
| 8,500,861 | B2 * | 8/2013 | Eisenberger | ....... B01D 53/0407 95/107 |
| 8,696,801 | B2 * | 4/2014 | Eisenberger | ........... B01D 53/06 95/107 |
| 9,227,153 | B2 * | 1/2016 | Eisenberger | ........... B01D 53/06 |
| 11,738,300 | B2 * | 8/2023 | Lackner | ................. B01D 53/08 95/21 |
| 12,070,717 | B2 * | 8/2024 | Lackner | ............. B01D 53/0438 |
| 12,343,674 | B2 * | 7/2025 | Lackner | ................. B01D 53/04 |
| 2010/0326272 | A1 | 12/2010 | Asaro | |
| 2012/0174779 | A1 * | 7/2012 | Eisenberger | ....... B01D 53/0407 95/107 |
| 2012/0174780 | A1 * | 7/2012 | Eisenberger | ....... B01D 53/0407 95/107 |
| 2012/0174781 | A1 * | 7/2012 | Eisenberger | ....... B01D 53/0462 95/139 |
| 2012/0174793 | A1 * | 7/2012 | Eisenberger | ....... B01D 53/0407 96/145 |
| 2015/0298049 | A1 * | 10/2015 | Eisenberger | ....... B01D 53/0407 95/107 |
| 2017/0113182 | A1 * | 4/2017 | Voskian | ............. B01D 53/326 |
| 2020/0398214 | A1 * | 12/2020 | Lackner | ................. B01D 53/04 |
| 2021/0387133 | A1 * | 12/2021 | Lackner | ............. B01D 53/0407 |
| 2023/0347278 | A1 * | 11/2023 | Lackner | ................. B01D 53/08 |
| 2025/0058266 | A1 * | 2/2025 | Lackner | ............. B01D 53/0454 |

OTHER PUBLICATIONS

Voskian, Sahag, et al. "Faradaic Electro-Swing Reactive adsorption for CO2 Capture," Energy & Environmental Science 2019, 12, 3530-3547. [retrieved Feb. 8, 2022]. Retrieved from the internet: <URL: https://pubs.rsc.org/en/content/articlepdf/2019/ee/c9ee02412c>; DOI: 10/1039/c9ee02412c.

* cited by examiner

DEVICE AND METHOD FOR PASSIVE COLLECTION OF ATMOSPHERIC CARBON DIOXIDE WITH ELECTRO-SWING MATERIALS

RELATED APPLICATIONS

This application is the U.S. National Stage of International Patent Application No. PCT/US2021/061171, filed Nov. 30, 2021, which claims the benefit and priority to of U.S. provisional patent application No. 63/119,325, filed Nov. 30, 2020 titled "Device and Method for Passive Collection of Atmospheric Carbon Dioxide With Electro-Swing Materials," the contents of each of which are hereby incorporated by reference in their entireties.

TECHNICAL FIELD

Aspects of this document relate generally to the passive collection of atmospheric carbon dioxide.

BACKGROUND

The need for technologies to remove carbon dioxide from ambient air has been well established. Nevertheless, the technologies are still new and the early air capture processes require large amounts of energy to operate. Because $CO_2$ in the air is very dilute (four hundred parts per million by volume), $CO_2$ collectors must not invest a significant amount of energy to draw in bulk air. Heating or cooling the air, drying the air, or significantly changing the air pressure would exceed any reasonable energy budget. Furthermore, conventional collection systems tend to exhibit the unfortunate combination of being costly and fragile. Conventional capture devices often have a large initial capital cost along with a high operating cost. Furthermore, conventional capture devices are sometimes better suited to a particular environment while being ineffective in others.

SUMMARY

According to one aspect, a device for passive collection of atmospheric carbon dioxide includes a release chamber having an opening, a sorbent regeneration system having a power supply, and a product outlet. The device also includes a capture structure coupled to the release chamber and having at least one collapsible support and a plurality of disks coupled to and spaced along the at least one collapsible support, each disk having an electro-swing sorbent material, and the capture structure being movable between a collection configuration and a release configuration. The device also has a lid covering the opening of the release chamber when the capture structure is in the release configuration. The collection configuration includes the capture structure extending upward from the release chamber to expose at least a portion of the capture structure to an airflow and allow the sorbent material of the plurality of disks to capture atmospheric carbon dioxide while, in each disk of the plurality of disks, a collection voltage is established across the electro-swing sorbent material. The release configuration includes the at least one collapsible support of the capture structure being collapsed, the lid covering the opening of the release chamber, and the plurality of disks enclosed inside the release chamber and conductively coupled to the power supply of the sorbent regeneration system such that plurality of disks receive power and a release voltage is established across the electro-swing sorbent material of each disk, resulting in the release of captured carbon dioxide from the electro-swing sorbent material and the formation of an enriched gas within the release chamber.

Particular embodiments may comprise one or more of the following features. Each disk of the plurality of disks may include at least one pair of electrical contacts on a top of the disk, and at least one pair of conductive posts on a bottom of the disk. Each pair of electrical contacts may be communicatively coupled to the electro-swing sorbent material of the disk, with each electrical contact communicatively coupled to a different conductive post and aligned such that when the capture structure is in the release configuration, the electrical contacts of a lower disk of a neighboring pair of disks may be in direct conductive contact with the conductive posts of an upper disk of the neighboring pair. The sorbent regeneration system may include at least one pair of base electrical contacts beneath the plurality of disks, the at least one pair of base electrical contacts communicatively coupled to the power supply and positioned such that when the capture structure is in the release configuration, at least one pair of conductive posts of the plurality of disks may be in direct conductive contact with at least one pair of base electrical contacts and the plurality of disks receives power from the power supply of the sorbent regeneration system. Each disk of the plurality of disks may include at least two edge contacts communicatively coupled to the electro-swing sorbent material of that disk. The release chamber may include at least one pair of power rails having opposite polarity. The power rails may be communicatively coupled with the sorbent regeneration system and positioned such that when the plurality of disks is in the release configuration, each disk of the plurality of disks may be in contact with the at least one pair of power rails through the at least two edge contacts such that the electro-swing sorbent material is communicatively coupled with the power supply of the sorbent regeneration system through the at least one pair of power rails. The at least one pair of power rails may be coupled to the release chamber through a plurality of biasing elements, such that the power rails are biased toward the plurality of disks when the capture structure is in the release configuration and maintain contact with the edge contacts of the plurality of disks. Each disk of the plurality of disks may include a battery and a voltage controller. The voltage controller may be communicatively coupled to the battery and the electro-swing sorbent material of the disk. Each battery of the plurality of disks may receive power from the power supply of the sorbent regeneration system at least while the capture structure is in the release configuration. The electro-swing sorbent material of the plurality of disks may be conductively coupled to the power supply of the release chamber while the capture structure is moving between the collection and release configurations. The plurality of disks may be conductively coupled to the power supply of the release chamber through the at least one collapsible support. Each disk of the plurality of disks may include a first segment having a first radius as measured from a centroid of the disk and defined as the disk at a radius less than the first radius, and/or a second segment having a second radius as measured from the centroid and defined as the disk at a radius less than the second radius but greater than the first radius. The first segment may be electrically isolated from the second segment. The collection voltage may be segmented, having a first segment voltage and a second segment voltage different from the first segment voltage. For each disk in the plurality of disks, the collection voltage may be established when the first segment voltage is established across the first segment at the same time the second segment voltage is established across the second segment, to manipulate the flow of carbon dioxide being sorbed into the electro-swing sorbent material while the capture structure is in the collection configuration. Each disk of the plurality of disks may include a first segment having a first radius as measured from a centroid of the disk and defined as the disk at a radius less than the first radius, and a second segment having a second radius as measured from the centroid and defined as the disk at a radius less than the second radius but greater than the first radius, the first segment being electrically isolated from the second segment. The release voltage may be segmented, having a third segment voltage and a fourth segment voltage different from the third segment voltage. For each disk in the plurality of disks, the release voltage may be established when the third segment voltage is established across the first segment at the same time the second segment fourth is established across the second segment, to manipulate the flow of carbon dioxide being released by the electro-swing sorbent material while the capture structure is in the release configuration. The release chamber may include a trough embedded around a top of the release chamber where the lid makes contact with the release chamber while the capture structure is in the release configuration, the trough having an inner wall and an outer wall, the trough at least partially filled with water. The lid may include a seal spike protruding out of the lid, the seal spike sized and positions such that when the lid is covering the opening of the release chamber while the capture structure is in the release configuration. The seal spike may be inside the trough and at least partially submerged in the water of the trough such that the water inhibits gas transfer between the atmosphere and the release chamber. The sorbent regeneration system may include a heat source. The heat source may be a steam source. The release chamber may include a sweep gas inlet coupled to a sweep gas source and may be configured to introduce a sweep gas to the release chamber to displace the enriched gas. The sweep gas may be steam. Each disk of the plurality of disks may be substantially planar. For each disk of the plurality of disks, the electro-swing sorbent material may include a plurality of sorbent surfaces coupled to a surface of the disk at an angle greater than zero. Each disk of the plurality of disks may include an aperture. The device may include an actuator coupled to the capture structure. The device may include a control system communicatively coupled to the actuator and configured to drive the actuator to move the capture structure between the collection configuration and the release configuration. The device may also include at least one sensor communicatively coupled to the control system. The control system may be configured to determine at least one ambient condition based on signals received from the at least one sensor, and autonomously drive the actuator to move the capture structure between the collection configuration and the release configuration based upon the at least one ambient condition. The at least one ambient condition may include at least one of a temperature, a humidity, and a wind speed. The device may have at least one baffle.

According to another aspect of the disclosure, a method for passive collection of atmospheric carbon dioxide includes preparing a passive collection device having a release chamber and a capture structure to collect atmospheric carbon dioxide by moving the capture structure into a collection configuration with an actuator driven by a control system. The capture structure has at least one collapsible support and a plurality of disks coupled to and spaced along the at least one collapsible support, each disk having an electro-swing sorbent material. The collection configuration has the capture structure extending upward from the release chamber while a collection voltage is established across the electro-swing sorbent material. The method also includes exposing at least a portion of the capture structure to an airflow to allow the electro-swing sorbent material of the plurality of disks to capture atmospheric carbon dioxide, and placing the capture structure in a release configuration by driving the actuator to lower the capture structure into the release chamber such that the at least one collapsible support collapses and the plurality of disks is entirely inside of the release chamber and conductively coupled to a power supply of a sorbent regeneration system such that plurality of disks can receive power. The method includes closing the release chamber with a lid, confining the plurality of disks inside the release chamber, and regenerating the sorbent material of the plurality of disks by establishing a release voltage across the electro-swing sorbent material of each disk with the sorbent regeneration system, to release the captured carbon dioxide, forming an enriched gas within the release chamber. Finally, the method includes emitting a product stream of enriched gas through a product outlet in fluid communication with the inside of the release chamber by displacing the enriched gas with a sweep gas introduced to the release chamber.

Particular embodiments may comprise one or more of the following features. The method may include determining at least one ambient condition local to the passive collection device based on a signal received from at least one sensor communicatively coupled to the control system. The method may include determining an optimal exposure time for the capture structure based on the at least one ambient condition. The sweep gas may be one of air, nitrogen, water vapor, and steam. Each disk of the plurality of disks may include at least one pair of electrical contacts on a top of the disk, and/or at least one pair of conductive posts on a bottom of the disk. Each pair of electrical contacts may be communicatively coupled to the electro-swing sorbent material of the disk, each electrical contact communicatively coupled to a different conductive post and aligned such that when the capture structure is in the release configuration, the electrical contacts of a lower disk of a neighboring pair of disks may be in direct conductive contact with the conductive posts of an upper disk of the neighboring pair. Placing the capture structure in the release configuration may further include placing at least one pair of conductive posts of the plurality of disks in direct conductive contact with at least one pair of base electrical contacts of the sorbent regeneration system, the base electrical contacts communicatively coupled to the power supply. Establishing the release voltage across the electro-swing sorbent material of each disk may include providing power to the plurality of disks with the power supply of the sorbent regeneration system. Each disk of the plurality of disks may include at least two edge contacts communicatively coupled to the electro-swing sorbent material of that disk. The release chamber may further include at least one pair of power rails having opposite polarity, the power rails communicatively coupled with the sorbent regeneration system. Placing the capture structure in the release configuration may further include placing every disk of the plurality of disks in contact with the at least one pair of power rails through the at least two edge contacts such that the electro-swing sorbent material is communicatively coupled with the sorbent regeneration system. Establishing the release voltage across the electro-swing sorbent material of each disk may include providing power to the plurality of disks with the power supply of the sorbent regeneration system through the at least one pair of power rails. The at least one pair of power rails may be coupled to the release chamber through a plurality of biasing elements, such that the power rails are biased toward the plurality of disks when the capture structure is in the release configuration and maintain contact with the edge contacts of the plurality of disks. The method may further include powering a battery and a voltage controller of each disk of the plurality of disks, the voltage controller communicatively coupled to the battery and the electro-swing sorbent material of the disk, using the sorbent regeneration system while the capture structure is in the release configuration. The collection voltage may be established using power from the battery when the capture structure is in the collection configuration. The electro-swing sorbent material of the plurality of disks may be conductively coupled to the power supply of the release chamber while the capture structure is moving between the collection and release configurations. The plurality of disks may be conductively coupled to the power supply of the release chamber through the at least one collapsible support. Each disk of the plurality of disks may include a first segment having a first radius as measured from a centroid of the disk and defined as the disk at a radius less than the first radius, and a second segment having a second radius as measured from the centroid and defined as the disk at a radius less than the second radius but greater than the first radius, the first segment being electrically isolated from the second segment. The collection voltage may be segmented, having a first segment voltage and a second segment voltage different from the first segment voltage. For each disk in the plurality of disks, establishing the collection voltage may include establishing the first segment voltage across the first segment at the same time the second segment voltage is established across the second segment, to manipulate the flow of carbon dioxide being sorbed into the electro-swing sorbent material while the capture structure is in the collection configuration. Each disk of the plurality of disks may include a first segment having a first radius as measured from a centroid of the disk and defined as the disk at a radius less than the first radius, and a second segment having a second radius as measured from the centroid and defined as the disk at a radius less than the second radius but greater than the first radius, the first segment being electrically isolated from the second segment. The release voltage may be segmented, having a third segment voltage and a fourth segment voltage different from the third segment voltage. For each disk in the plurality of disks, establishing the release voltage may include establishing the third segment voltage across the first segment at the same time the fourth segment voltage is established across the second segment, to manipulate the flow of carbon dioxide being released by the electro-swing sorbent material while the capture structure is in the release configuration. The release chamber may include a trough embedded around a top of the release chamber where the lid makes contact with the release chamber while the capture structure is in the release configuration. The trough may have an inner wall and an outer wall, the trough at least partially filled with water. The lid may include a seal spike protruding out of the lid. Closing the release chamber with the lid may include inserting the seal spike into the trough such that the seal spike is at least partially submerged in the water of the trough, the water inhibiting gas transfer between the atmosphere and the release chamber.

According to yet another aspect of the disclosure, a system for passive collection of atmospheric carbon dioxide includes at least one passive collection cluster, each passive collection cluster having at least two passive collection devices. Each passive collection device has a release chamber having an opening and a sorbent regeneration system having a power supply, a capture structure coupled to the release chamber and having at least one collapsible support and a plurality of disks coupled to and spaced along the at least one collapsible support, each disk having an electro-swing sorbent material, and the capture structure being movable between a collection configuration and a release configuration. Each passive collection device also includes a lid covering the opening of the release chamber when the capture structure is in the release configuration, an actuator coupled to the capture structure, and a product outlet in fluid communication with the inside of the release chamber and configured to receive a product stream of enriched gas. Each passive collection device also includes a control system communicatively coupled to each passive collection cluster and configured to drive the actuator to move the capture structure of at least one passive collection device between the collection configuration and the release configuration. The product outlet of each passive collection device within the same cluster is in fluid communication. For each passive collection device, the collection configuration includes the capture structure extending upward from the release chamber to expose at least a portion of the capture structure to an airflow and allow the sorbent material of the plurality of disks to capture atmospheric carbon dioxide while, in each disk of the plurality of disks, a collection voltage is established across the electro-swing sorbent material. For each passive collection device, the release configuration includes the at least one collapsible support of the capture structure being collapsed, the lid covering the opening of the release chamber, and the plurality of disks enclosed inside the release chamber and conductively coupled to the power supply of the sorbent regeneration system such that plurality of disks receive power and a release voltage is established across the electro-swing sorbent material of each disk, resulting in the release of captured carbon dioxide from the electro-swing sorbent material and the formation of an enriched gas within the release chamber.

Particular embodiments may comprise one or more of the following features. The at least two passive collection devices of each cluster may share the same actuator. The release chamber of each passive collection device in the same cluster may be in fluid communication, such that the enriched gas of one collection device may be swept through the release chamber of a neighboring collection device. The system may include at least one sensor communicatively coupled to the control system. The control system may be configured to determine at least one ambient condition based on signals received from the at least one sensor, and autonomously drive at least one actuator to move at least one capture structure between the collection configuration and the release configuration based upon the at least one ambient condition. The at least one ambient condition may include at least one of a temperature, a humidity, and a wind speed. The control system may be configured to operate the passive collection devices in series to produce a continuous product stream of enriched gas. The at least to passive collection devices of each cluster may share the same power supply.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

Figure 1A:
FIGS. 1A and 1B are perspective and side views of a device for passive collection of atmospheric carbon dioxide using electro-swing sorbent materials.
Figure 1A:
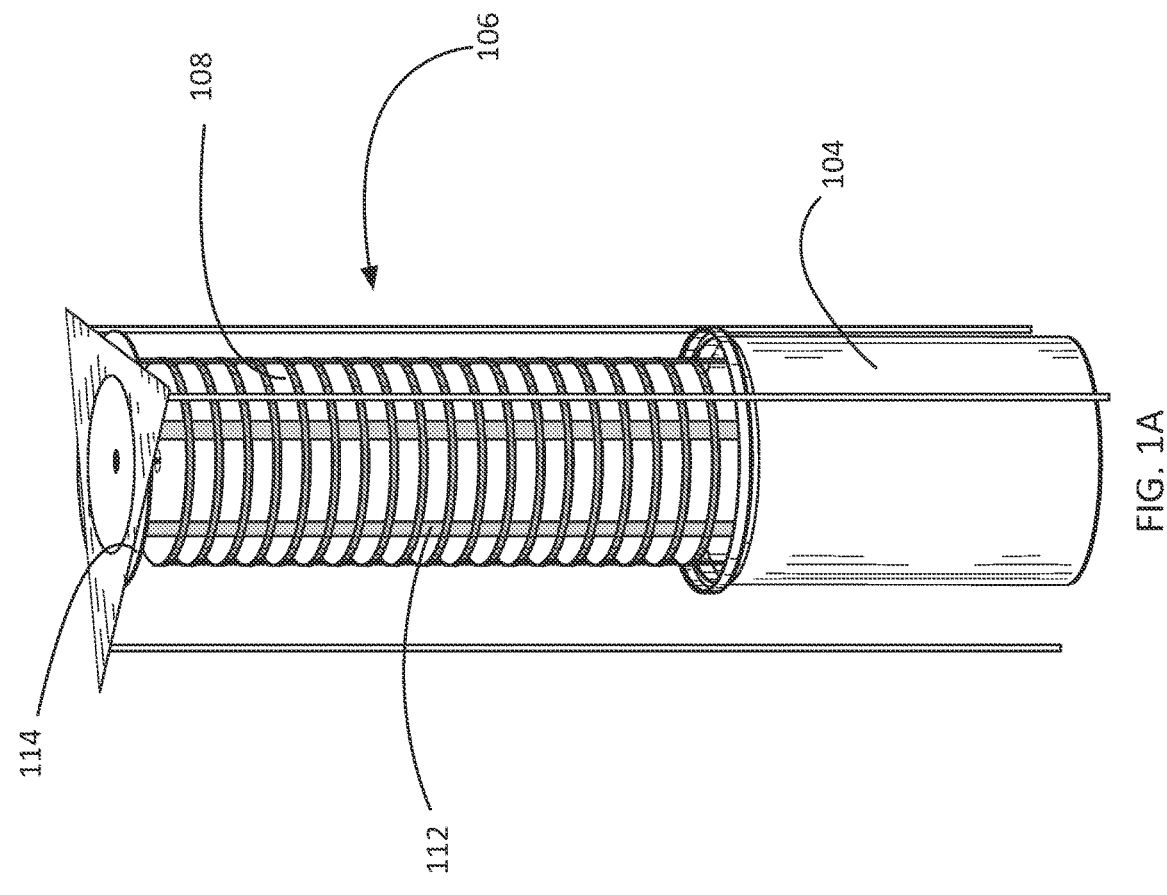

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

The need for technologies to remove carbon dioxide from ambient air has been well established. Nevertheless, the technologies are still new and the early air capture processes require large amounts of energy to operate. Because $CO_2$ in the air is very dilute (four hundred parts per million by volume), $CO_2$ collectors must not invest a significant amount of energy to draw in bulk air. Heating or cooling the air, drying the air, or significantly changing the air pressure would exceed any reasonable energy budget. Furthermore, conventional collection systems tend to exhibit the unfortunate combination of being costly and fragile. Conventional capture devices often have a large initial capital cost along with a high operating cost. Furthermore, conventional capture devices are sometimes better suited to a particular environment while being ineffective in others.

Contemplated herein are devices, systems, and methods for the passive collection of atmospheric carbon dioxide from natural air flow or wind, while employing a simplified design that is durable, energy efficient, and capable of being adapted for use in various conditions and with a variety of sorbent materials, including electro-swing materials. In some embodiments, these devices may be organized into clusters and systems, and may provide continuous capture of $CO_2$, as well as supply a continuous stream of $CO_2$ enriched gas, as will be discussed in greater detail, below. In other embodiments, these devices might be installed and operated as individual units. Additionally, in some embodiments, some of the devices, systems, and methods contemplated herein may be implemented autonomously or semi-autonomously, adjusting for changing environmental conditions to improve efficacy and efficiency. Some embodiments of the contemplated devices and methods may be used for maintaining a breathable oxygen atmosphere by scrubbing closed atmospheric environments of exhaled carbon dioxide that builds up over time.

While the following discussion will focus on the use of electro-swing sorbent materials, which are reversible for release of captured $CO_2$ against back pressure and which may provide a greater capture volume per unit time than other types of sorbent materials, it should be noted that the systems, methods, and devices contemplated herein may be adapted for use with a variety of sorbents, including materials sensitive to a vacuum, thermal, moisture, and/or electro-swing, individually or in combination.

Figure 1B:
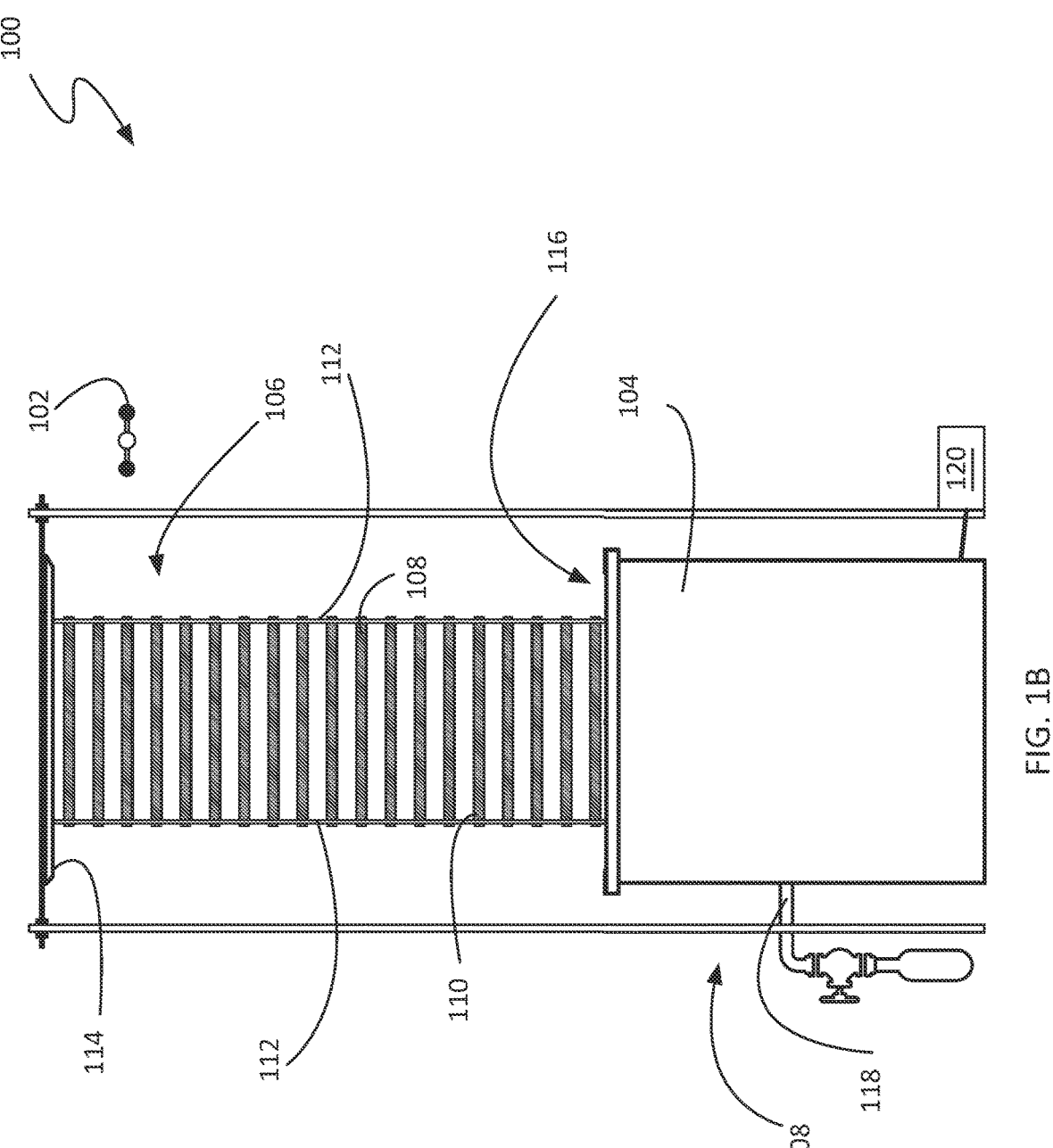

FIGS. 1A and 1B are perspective and side views of a non-limiting example of a device 100 for passive collection of atmospheric carbon dioxide 102 (hereinafter "passive collection device", "collection device", or just "device"). Specifically, FIG. 1A is a perspective view, and FIG. 1B is a side view.

According to various embodiments, the collection device 100 comprises a capture structure 106 configured to expose a sorbent material 110 to ambient air, a release chamber 104 (or regeneration chamber) into which the capture structure 106 may be placed through an opening 116, a lid 114 to seal or otherwise enclose the capture structure 106 inside the release chamber 104, and a means of extracting the $CO_2$ enriched gas from within the chamber through a product outlet 118. Some embodiments may also comprise a means of introducing heat and/or moisture to the release chamber 104 (either separately or in unison) to facilitate the release of capture carbon dioxide from the sorbent material 110.

In the context of the present description and the claims that follow, a release chamber 104 is an enclosure within which captured carbon dioxide is released for subsequent sequestration, refinement, or application. The release chamber 104 has at least one opening, opening 116, through which it receives captured carbon dioxide and the material in which it is captured (e.g., the capture structure 106 and its sorbent material 110, etc.). It should be noted that while the collection device 100 has a vertical orientation, with the capture structure 106 being lowered into the release chamber 104, other embodiments may have different orientations and/or movement directions. A non-limiting collection of exemplary alternative geometries will be discussed with respect to FIGS. 5A-5D, below.

The release chamber 104 may be constructed of a durable material appropriate for both the external environment in which the collection device 100 is being employed, as well as the internal environment inherent to its operation (e.g., the nature of the sorbent regeneration system 406, etc.).

According to various embodiments, the release chamber 104 comprises all the necessary equipment or structure to accomplish the regeneration of the sorbent material used to collect carbon dioxide, which may include (but is not limited to) some or all of the following steps: modifying the voltage supplied to the capture structure 106, pushing sweep gas through the chamber, evacuating the chamber, and heating the chamber. As will be discussed below, some embodiments may provide a constant supply of electricity to the capture structure 106, while other embodiments may comprise a capture structure 106 that maintains a voltage across the sorbent material 110 using a battery that is periodically charged by the release chamber 104 during regeneration. Regeneration of the capture structure 106 will be discussed in greater detail with respect to FIG. 4B, below.

In some embodiments, the release chamber 104 comprises an internal flow system comprising fans or blowers to create a recirculating air flow. In other embodiments, the release chamber 104 may comprise a gas recirculation system, where the flow inside the chamber 104 is driven by a gas being pumped into the chamber 104 and returned to an external recirculation system. In some embodiments, water vapor will be used as a sweep gas. In passive collection systems and/or clusters, which will be discussed below with respect to FIG. 6, multiple collection devices 100 may share a single gas recirculation system, or may employ a shared system in conjunction with individual internal systems.

In the context of the present description and the claims that follow, the capture structure 106 is the structure or collection of structures upon which, or in which, the atmospheric $CO_2$ is captured. As shown, the capture structure 106 is made up of a plurality of disks 108 coupled to and spaced along one or more collapsible supports 112. The disks 108 comprise one or more electro-swing sorbent materials 110 responsible for the capture of carbon dioxide. Electro-swing sorbent materials 110 will be discussed further, below. In some embodiments, the sorbent material 110 may be disposed on one or more surfaces of a disk 108, while in other embodiments, the disk 108 may comprise a plurality of electrodes made of sorbent material 110. As will be discussed, the sorbent material 110 releases captured $CO_2$ when it is regenerated (e.g., upon modification of an applied voltage as part of a sorbent regeneration system 406 inside the release chamber 104, etc.).

As shown, when the capture structure 106 is "deployed", exposed to the atmosphere to collect carbon dioxide, the disks 108 are suspended from (or along, in some embodiments) one or more collapsible supports 112 such that air may flow between the disks 108 from any direction. Such an arrangement is advantageous when used to capture $CO_2$ from natural air flow and wind, which may shift in direction. Furthermore, while the disk-based structures contemplated herein are described in the context of use in a passive air flow, it should be understood that they may also be used with a driven air flow as well.

The non-limiting example shown in FIGS. 1A and 1B is tall and cylindrical and makes use of circular disks. In some embodiments, the device and/or the disks 108 may have a roughly circular cross-section, which may be advantageous for use in passive air capture in conditions where the air flow could come from any direction. In other embodiments, the device and/or disks 108 may have a non-circular cross-section. Various disk 108 designs will be discussed in greater detail below with respect to FIGS. 3A, 3B, and 3C.

As shown, the capture structure 106 may comprise a stack of disks 108. According to various embodiments, the capture structure 106 stack could range from a few (5 to 10) disks 108, to a large number (>1000). Particular embodiments make use of stacks between 50 and 200 disks.

Disks 108 are supported by one or more collapsible supports 112 that, when raised, allows them to hang down freely, under gravity, so that air can pass through the gaps between them. In many embodiments, the disks 108 rest on each other when the capture structure 106 is collapsed inside the release chamber 104, using small raisers to maintain a small gap between the disks 108 when they are at rest within the chamber 104. In some embodiments, these risers also place the plurality of disks 108 in electrical communication with each other when stacked in the release chamber 104, allowing them to all receive power from the same source via a contact at the bottom of the chamber 104. See, for example, the embodiment shown in FIGS. 4A and 4B.

In addition to collecting atmospheric carbon dioxide, the capture structure 106 is able to move between an arrangement suitable for collecting the atmospheric carbon dioxide (e.g., a collection configuration or phase), and an arrangement allowing the captured $CO_2$ to be released into the release chamber 104 (e.g., a release configuration or phase). The collection and release configurations will be discussed with respect to FIGS. 4A and 4B, below.

As previously mentioned, the disks 108 are coupled to, and spaced along, one or more collapsible supports 112. In some embodiments, the collapsible supports 112 may supply electricity to the disks 108 they hold. FIGS. 1A and 1B show a non-limiting example having multiple collapsible supports 112 running down the edges of the disks 108. Examples of the collapsible support 112 include, but are not limited to, thin ropes, straps, lines, or chains. In one embodiment, each disk 108 may be connected to the one above, and thereby carries the weight of all the disks 108 below it. In another embodiment, the collapsible support 112 is continuous, and designed to carry all the weight of the disks 108, whereas the disk 108 structure is designed to only carry its own weight. To give a specific example of such a support system, consider a plurality of narrow, long ladders formed by long strings or chains, with solid rods for rungs. These ladders may be narrow, e.g., 1 cm wide, or could be many centimeters wide. With a minimum of three such ladders arranged evenly around the edge of the disks 108, each disk 108 could be hooked onto a single rung. The ladder structure would support the weight of all the disks 108, while the individual disks 108 would only have to support their own weight. By increasing the number of ladders, the thickness of the lines comprising the sides of the ladders can be made thinner, making it easier to collapse the ladder. Advantageously, if the number of ladders is larger than three it is possible to remove and replace a single ladder during maintenance while the capture structure 106 is in the open/collection configuration.

In another embodiment, the disks 108 may be held up by telescoping tubes or rigid rods that fold in zig-zag pattern tangential to the disks 108, or by creating "Dog-bone" shapes that protrude from one disk 108 (e.g., the bottom disk, etc.) into an open space in neighboring disks (e.g., the disks above, etc.). In this design it may be necessary to have consecutive disks 108 anchored at different locations shifted by a few degrees along the rim of the disk to make room for the length of the dog-bone so as to not interfere with that of the disk 108 above.

In yet another embodiment, the collapsible support 112 may be a conical shape surrounding a hole in the center of the disk 108. When stacked, the disks 108 rest on each other and extend their distance as cones move slight apart. Such a design would naturally help with the self-centering of the disks 108 as they become stacked. If the cones are truncated and therefore open at the top, they would generate a vertical, open channel through the middle of the collapsed disk 108 stack, which could help in guiding air flows during regeneration of the disks 108. Those skilled in the art will recognize other collapsible configurations exist.

According to various embodiments, the disks 108 of a collection device 100 are separated from each other when in a collection configuration or phase and are stacked on top of each other in a regeneration or release phase. As an option, the sensitive portions of the disks 108 may be protected from contacting other disks 108 by a buffer structure, such as a pad or rim. Buffering might be structured in such a manner as to help direct air flows to enhance collection and/or harvest. In some embodiments, this buffer or rim may also comprise electrical contacts, allowing the disks 108 to be charged and/or have a voltage applied (i.e., release voltage 438) during the release phase, when they are stacked.

It may be advantageous to limit the motion of the stack of disks 108 when hanging freely (e.g., to prevent damage, optimize sorbent exposure, etc.). One way of limiting the motion is to contain the hanging stack between guides as it is lifted up. One example would be a set of vertical poles, which may also give structural support to the lifting structure. Three such poles would already be sufficient to constrain the sideways motion of the disks 108. Another embodiment may have the disks 108 connected through guides along a center hole, that prevents relative motions of the disks 108. If the disks 108 and the lid 114 are ring shaped, then guides could also run on the inside of the disks 108. Another option for limiting movement of the disk 108 is to tether the bottom disk 108 to the bottom of the release chamber 104.

According to various embodiments, the disks 108 may be coupled to the bottom of the lid 114, and the lid 114 is pulled up with the disks 108 as the device 100 is opening up to a collection configuration. In other embodiments, the lid 114 may open sideways, either by sliding or by hinging like a door. The lifting mechanism would then couple to a fixture on the top of the capture structure 106 in order to lift it up without the lid 114. Such a design would be of particular interest in a cluster of collection devices 100 where the lifting mechanism could be shared among multiple devices 100. As an option, the capture structure 106 may be attached to some form of support structure once it has been fully lifted.

Once the capture structure 106 is fully laden with captured carbon dioxide, it is moved into the release chamber 104 where the $CO_2$ will be retrieved and the sorbent material 110 regenerated in preparation for further collection. According to various embodiments, the collection of captured $CO_2$ and the regeneration of the sorbent material 110 is accomplished after the release chamber 104 has been closed by the placement of a lid 114 over the opening 116. According to various embodiments, the lid 114 (and the capture structure 106) may be lowered onto the opening 116 (and the capture structure lowered into the chamber 104) by some form of actuator 120. In the context of the present description and the claims that follow, an actuator 120 is any device that is capable of affecting movement, and may include, but is not limited to, motors, pistons, hydraulics, screw drives, lifts, rollers, and other devices known in the art. As an option, the actuator 120 may be coupled to the capture structure 106 directly, through the lid 114, or through some other structure. In some embodiments, the actuator 120 may be coupled to the release chamber 104 as well. According to various embodiments, the lid 114 is configured to mate with the release chamber 104, forming a closed chamber. In some embodiments, the lid may form an airtight seal with the release chamber 104.

As shown, the passive collection device 100 also comprises a product outlet 118. The product outlet 118 allows fluid communication between the inside of the release chamber 104 and some structure external to the release chamber 104 (e.g., a storage device, an upgrade system, another release chamber 104, etc.), allowing for the collection of a product stream that is rich in $CO_2$ (e.g., a higher ratio of $CO_2$ to other materials than is present in the ambient air, etc.). In some embodiments, the product outlet 118 may be configured for a gaseous product stream, while in others it may be configured to emit a liquid product stream (e.g., $CO_2$ captured in a brine, etc.).

While the term disk 108 is derived from one possible design where disks 108 are flat, it is important to note that in the context of the present disclosure, the term disk 108 is intended to accommodate a much broader range of geometries. In some embodiments, disks 108 are made entirely out of sorbent material, while in others they are made from structural material that hold sorbent material 110 in place.

In some embodiments, the disks 108 may have a circular cross-section (along the central axis of the stack). In other embodiments, other shapes may be employed, including but not limited to, circular approximations (e.g., higher order polygons), triangles, rectangles, squares, hexagons, stars, rings, and the like. While the circular cross-section may be appropriate for use in environments with unpredictable wind direction, in other embodiments, a more oblong disk 108 may be employed in conditions where the wind has a prevailing direction.

The capture structure 106 comprises an electro-swing sorbent material 110. In the context of the present description and the claims that follow, an electro-sorbent material 110 is a material whose affinity to $CO_2$ can be changed dramatically by changing the applied voltage. For the purpose of the following discussion, these materials will be described as having two states, capture and release, though in practice, some materials react to changes in the applied voltage with more than two states. In the capture state, the material has a high affinity to $CO_2$, and loads up with $CO_2$ from the ambient gas surrounding the material. In the release state, the material releases the $CO_2$, even against some back pressure.

According to various embodiments, these electro-swing materials 110 may be classified into three types. Type 1 requires a steady voltage supply while collecting $CO_2$ (i.e., a collection voltage 436), but the $CO_2$ can be released without a current flowing or the need to maintain a voltage, which is allowed to float freely. Type 2 requires a steady voltage supply while releasing $CO_2$ (i.e., a release voltage 438), but the $CO_2$ can be collected without a current flowing or the need to maintain a voltage, which is allowed to float freely. Type 3 requires a steady voltage supply while collecting $CO_2$ (i.e., collection voltage 436), and a different voltage needs to be maintained when $CO_2$ is released (i.e., release voltage 438). The following discussion of how these materials 110 may be implemented in a capture device 100 will be done in the context of Type 3 materials, which require an applied voltage in both phases of operation. It should be clear to those skilled in the art that the designs and structures contemplated herein may be adapted for use with Type 1 and Type 2 materials, which only require a voltage during one of the two phases. The electro-swing materials used in the contemplated designs and structures may be adapted for use with various power sources. For example, in some embodiments the power source may be a DC source such as a battery, while in other embodiments, the power source may be a rectified AC power source. As an option, in some embodiments the power supply may have minimal filtering.

Figure 2:
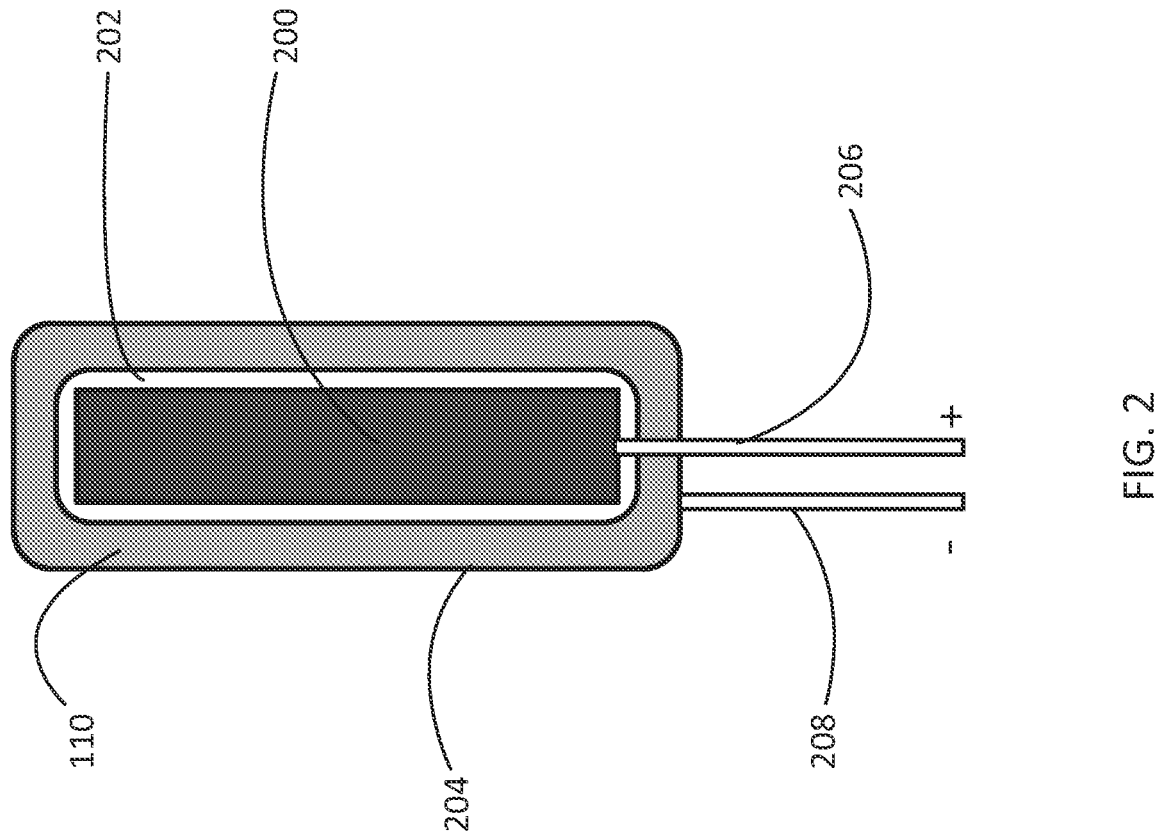
FIG. 2 is a cross-sectional view of an electro-swing sorbent material application.

FIG. 2 shows a non-limiting example of a cross-sectional view of an application of an electro-swing material 110. As shown, the electro-swing material 110 is wrapped around an electrode 200, with the two separated by an electrolyte membrane 202 to prevent short circuits. The outer surface 204 of the electro-swing material 110 acts as a counter electrode to the core electrode 200. Providing opposite charges to the two electrodes via leads 206, 208 drastically changes the $CO_2$ affinity of the electro-swing material 110. Exemplary electro-swing materials 110 include, but are not limited to, quinone compounds such as polyanthraquinone. Exemplary materials for the core electrode 200 include, but are not limited to, ferrocene compounds such as polyvinylferrocene.

Figure 3A:
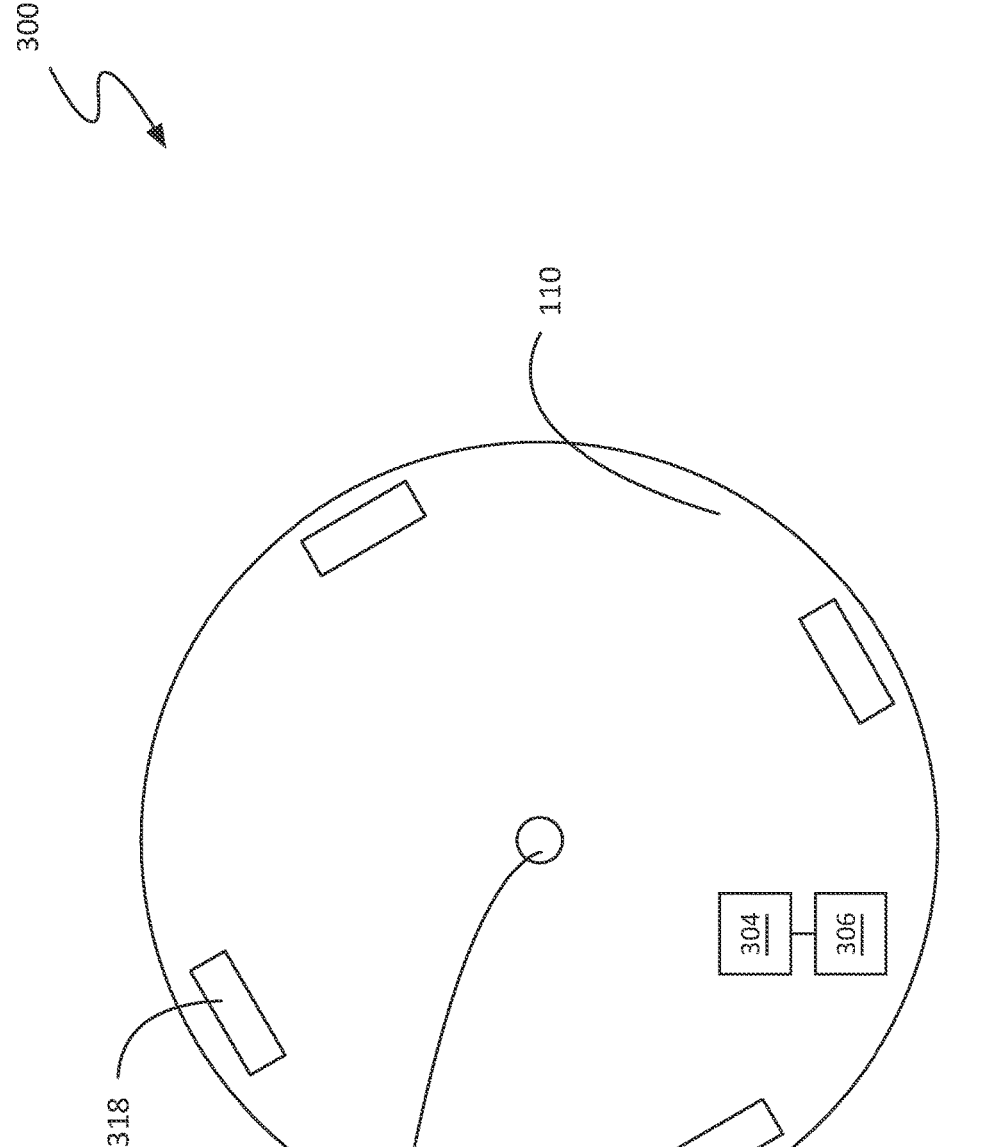
FIGS. 3A, 3B, and 3C are views of various sorbent disk geometries.
Figure 3B:
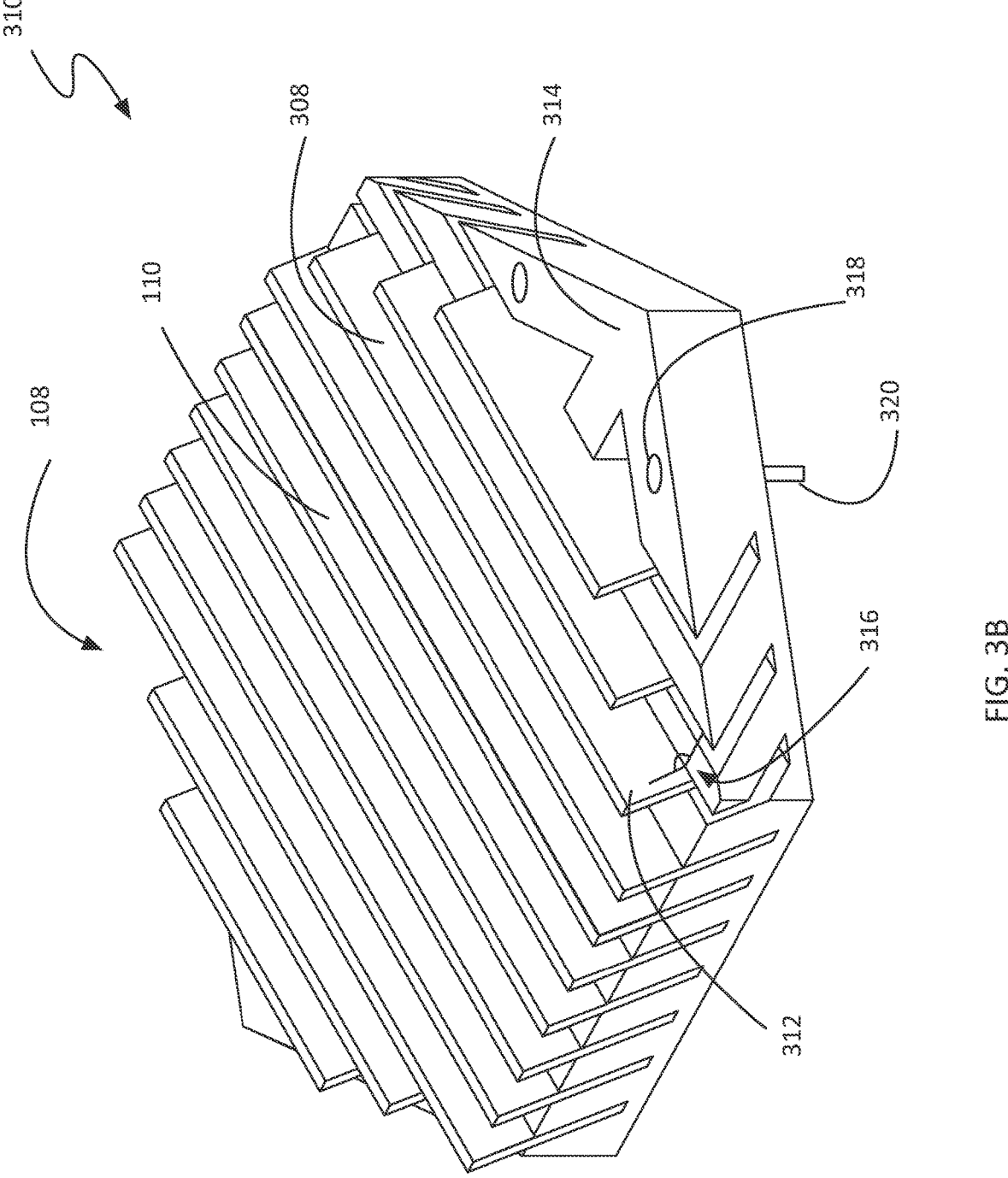
Figure 3C:
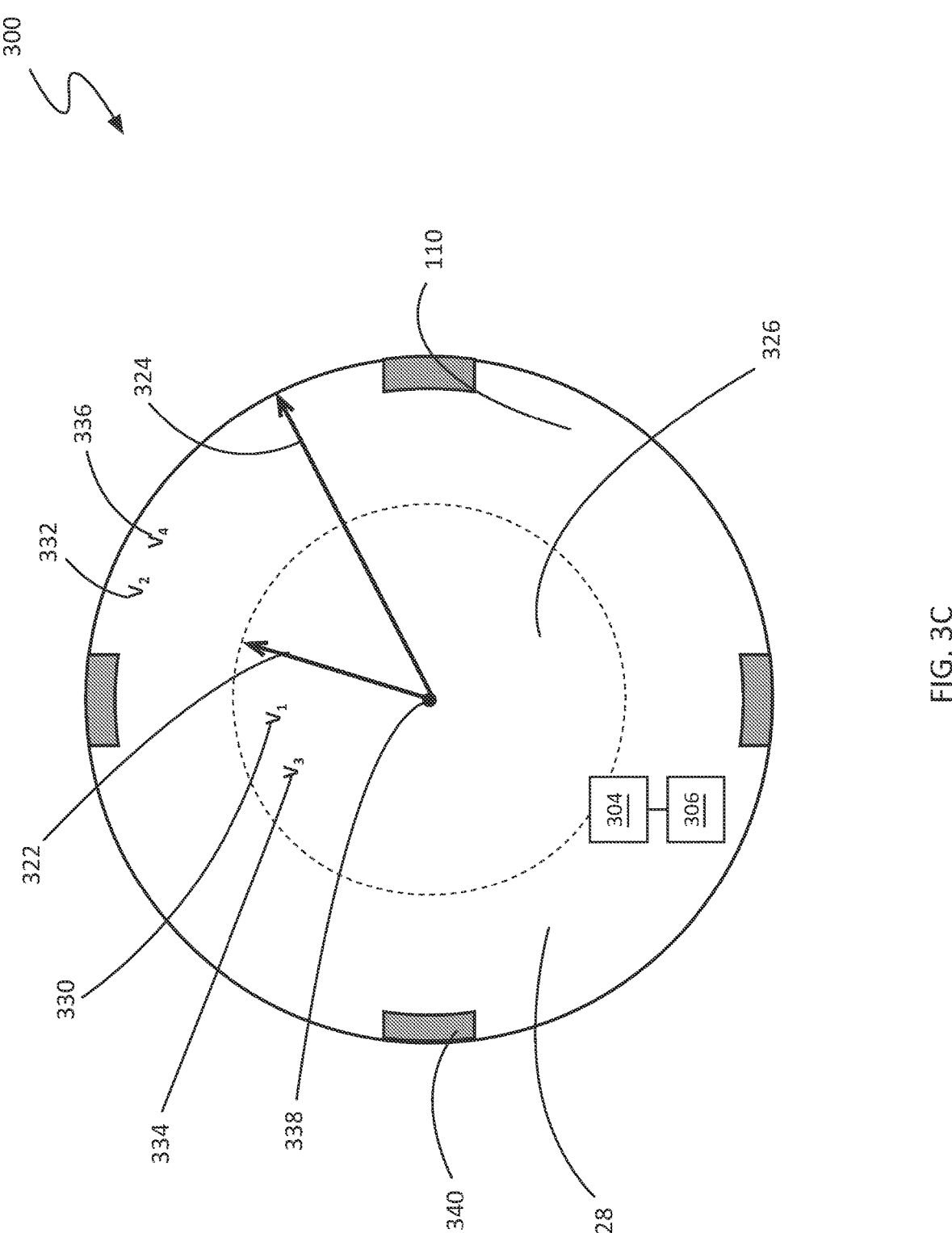

FIGS. 3A, 3B, and 3C show views of non-limiting examples of various disk 108 geometries. FIG. 3A shows a top view of a non-limiting example of a circular-shaped disk 300 having an electro-swing sorbent material 110. As shown, the circular disk 300 comprises a central aperture 302 through which air may flow, and/or through which a collapsible support 112 may pass and couple to each disk 108.

In some embodiments, the disks 108 may be continuously supplied energy through the one or more collapsible supports 112 or some other structure through which the disks 108 are conductively coupled to a power supply (i.e., the power supply 408 of the sorbent regeneration system 406 to be discussed in the context of FIGS. 4A and 4B below). As an option, in some embodiments, each disk 108 may have components that are not shared with other disks 108, providing redundancy and modularity, in addition to the ability to cause the disks to operate out of sequence (e.g., promoting gas flow within the release chamber 104 by applying different voltages at different times to different disks, etc.). For example, in some embodiments, each disk 108 may comprise its own voltage controller 306 that are all coupled to the same power supply.

In other embodiments, the disks 108 may have to provide their own power when not collapsed into the release chamber 104, where they would be recharged. The non-limiting example of FIG. 3A shows an embodiment having a battery 304 and a voltage controller 306, to allow control over the voltage trajectory. According to various embodiments, the voltage controller 306 is communicatively coupled to the battery 304 as well as the electro-swing sorbent material 110 of that disk 108. When the capture structure 106 is lowered into the release chamber 104 and placed into the release configuration 412 (as shown in FIG. 4B), the battery 304 would be recharged when the disk 108 is placed into electrical communication with a power supply 408 of the chamber 104. In still other embodiments, the disks 108 may be disconnected from a main power supply 408 when not in the release configuration 412, but share resources between groups of two or more disks 108, such as batteries 304 and/or voltage controllers 306.

In some embodiments, the disks 108 may hang from a structure, such as the lid 114, while exposed to the wind, and rest on each other when lowered into the release chamber 104. The disks 108 may comprise strengthened pads, rims, or lips, designed to carry the weight of the disks 108 above, when the stack is in its collapsed form, according to various embodiments. These pads also may extend further in the vertical direction than the more fragile parts of the disk 108 (e.g., sorbents, etc.), so that physical contact between disks

108 is limited to locations designed to carry this weight. In some embodiments, the disks 108 (whether circular or with corners) may have the sorbent/resin hung from the disk 108 and maybe in addition to the sorbent laid across the disk 108.

The structure of the disk 108 and the mechanism to hang the disk 108 may be adjusted, based on local geography and weather conditions. For example, in an area of high winds the disk 108 may be substantially more robust and may be completely disconnected from the chamber 104 in order to best insure support. In some embodiments there may be a support structure that collapses or hides during high winds, pulling the sometimes fragile disks 108 into shelter. The multiplicity of support structure options to raise and lower the disks 108 simply reflects the variety of needs that may exist for a device that could be placed at nearly any location around the world.

In some embodiments, the disks 108 may be essentially flat, disregarding any rim or pad used in stacking. In other embodiments, the disks 108 may be non-planar, such as bowl or helmet shaped. In still other embodiments, the disks 108 may comprise a framework that can enclose or otherwise secure a sorbent material 110.

FIG. 3B is a perspective view of a non-limiting example of a paneled disk 310 comprising a plurality of sorbent electrode surfaces 308 that are made of an electro-swing sorbent material 110. In some embodiments, the disks 108 may be highly structured to facilitate gas contact with their surface. The disks 108 may comprise channels or passageways that create gas flow paths from the top to the bottom of a disk 108 to facilitate gas flow that comes in close contact with the sorbent material 110 of the disk 108.

As shown, each disk has electrical contacts 318 on one side of the disk, and conductive posts 320 on the other. When the disks are stacked during the release phase, the posts 320 keep them separated and undamaged, while the contacts 318 and the posts 320 allow all the disks to receive needed power, either to recharge batteries or apply the voltage needed to release the captured $CO_2$ (i.e., release voltage 438).

In some embodiments, a disk 108 may have a collection of pairs of electrical contacts 318 and conductive posts 320, each pair handling both polarities. As an option, the pairs may be arranged in a symmetric fashion (see, for example, the contacts 318 of FIG. 3A), and may serve to stabilize the disks 108 when they are stacked in the release chamber 104, in addition to providing needed electricity for the electro-swing sorbent material 110.

In some embodiments, the disk 108 may be one large sorbent structure. In other embodiments, including the non-limiting example shown in FIG. 3B, the sorbent material 110 may be segmented into slices or surfaces 308 that are individually attached a surface 314 of the paneled disk 310, through which they are powered. One such disk could be hexagonal, such as the one shown in FIG. 3B.

To maximize air mixing, the surface of the disk 108 may be variegated, and rough, and adjacent disks 108 may have different structures nearby. For example, if a disk 108 is made from a number of different disks, the surfaces vertically on top of each other need not be identical or need not be oriented in the same way. In some embodiments, the sorbent surfaces 312 may be angled with respect to the surface 314 of the disk 310, forming an angle 316.

In some embodiments, the disk 108 may have mounted on it triangular (or some other raised shape) raised sorbents and baffles that increase exposure and also cause turbulence to enhance capture.

As shown, in some embodiments, the disks may be placed into electrical contact when stacked during the release phase. In other embodiments, the disks may remain in electrical contact with a power source located in the body of the device. For example, in some embodiments, each disk may be wired to the top or the bottom of the capture structure, which is itself in electrical communication with a power source. As an option, the wires may be on biased spools that retract loose wire as the capture structure collapses into the release chamber.

In other embodiments, the disks may be placed into electrical contact with the release chamber (and thus, a power supply) through contact along their edges with a connector along the interior wall of the chamber.

For example, in one embodiment, a metal bar may be pushed by springs against contact points on the edge of each disk. Two such bars of opposite polarity could supply the disk. As an option, some redundancy could be assured by using several such bars of each polarity, in case that through some slight misalignment a disk does not make contact.

According to various embodiments, the voltage applied to an electro-swing sorbent material 110 can have an effect on the rate at which the sorbate gas is sorbed or released. This can provide a level of control not available in systems and devices using other swing sorbents. In order to optimize gas flow, in some embodiments the voltage supplied to a disk 108 may be segmented and shaped. For example, in some embodiments, the driving voltage may be varied by different radii within each disk 108.

FIG. 3C shows a top view of a non-limiting example of a circular-shaped disk 300 having an electro-swing sorbent material 110 that has been segmented. As shown, in this non-limiting example, the sorbent material 110 is broken into two segments, a first segment 326 and a second segment 328. While two segments were chosen for visual clarity, it should be known that in other embodiments, 3, 4, 5, or more segments may be used. These segments are electrically isolated from each other, so different voltages may be applied to them at the same time.

In some embodiments, a disk 108 may be segmented radially. For example, here the first segment 326 is defined as the disk 108 that exists up to a first radius 322, as measured from the centroid 338 of the disk 108, and a second segment 328 that is defined as the disk 108 that exists between the first radius 322 and a second radius 324 that is different (and larger) than the first radius 322. In other embodiments, the segmenting may not have the same degree of rotational symmetry. For example, in one embodiment, a disk 108 may be segmented in wedges, which could have their voltages manipulated in a sequence to create a rotating flow within the release chamber 104.

As mentioned before, with some electro-swing materials 110, voltage is only applied for one of the two phases, collection and release. In others, voltage is used in both phases. The same can be said for segmented voltages. In some embodiments, a first segment voltage 330 and a second segment voltage 332 different from the first segment voltage 330 may be applied to the respective segments of the non-limiting example of a disk 300 shown in FIG. 3C while in the collection configuration 400. In other embodiments, a third segment voltage 334 may be applied to the first segment 326 and a fourth segment voltage 336 may be applied to the second segment 328 when the disk 300 is in the release configuration 412. In still others, these segmented voltages may be applied in both configurations. In some embodiments, the first segment voltage 330 may be the same, or even just the same magnitude but opposite sign, as the third segment voltage 334 on the same disk 300, and/or the second segment voltage 332 may be the same, or even just the same magnitude but opposite sign, as the fourth segment voltage 336. In still other embodiments, all four voltages may be different. In additional embodiments, some or all of these voltages may vary with time. As an option, the voltage difference between segments may be held constant, even as the voltages vary (e.g., due to change in loading of the sorbent material with sorbate, etc.).

Also shown in the non-limiting example of FIG. 3C are edge contacts 340. In some embodiments, the electrical contacts 318 previously discussed may be located on surfaces that will be in contact with the conductive posts 320 on a neighboring disk when they are stacked in the release chamber 104. In other embodiments, the disks may be powered from the side. Specifically, in some embodiments, one or more pairs of edge contacts 340 may be present on the disks, which make contact with a powered structure within the release chamber 104. Such a structure will be discussed with respect to FIG. 5A, below.

Figure 4A:
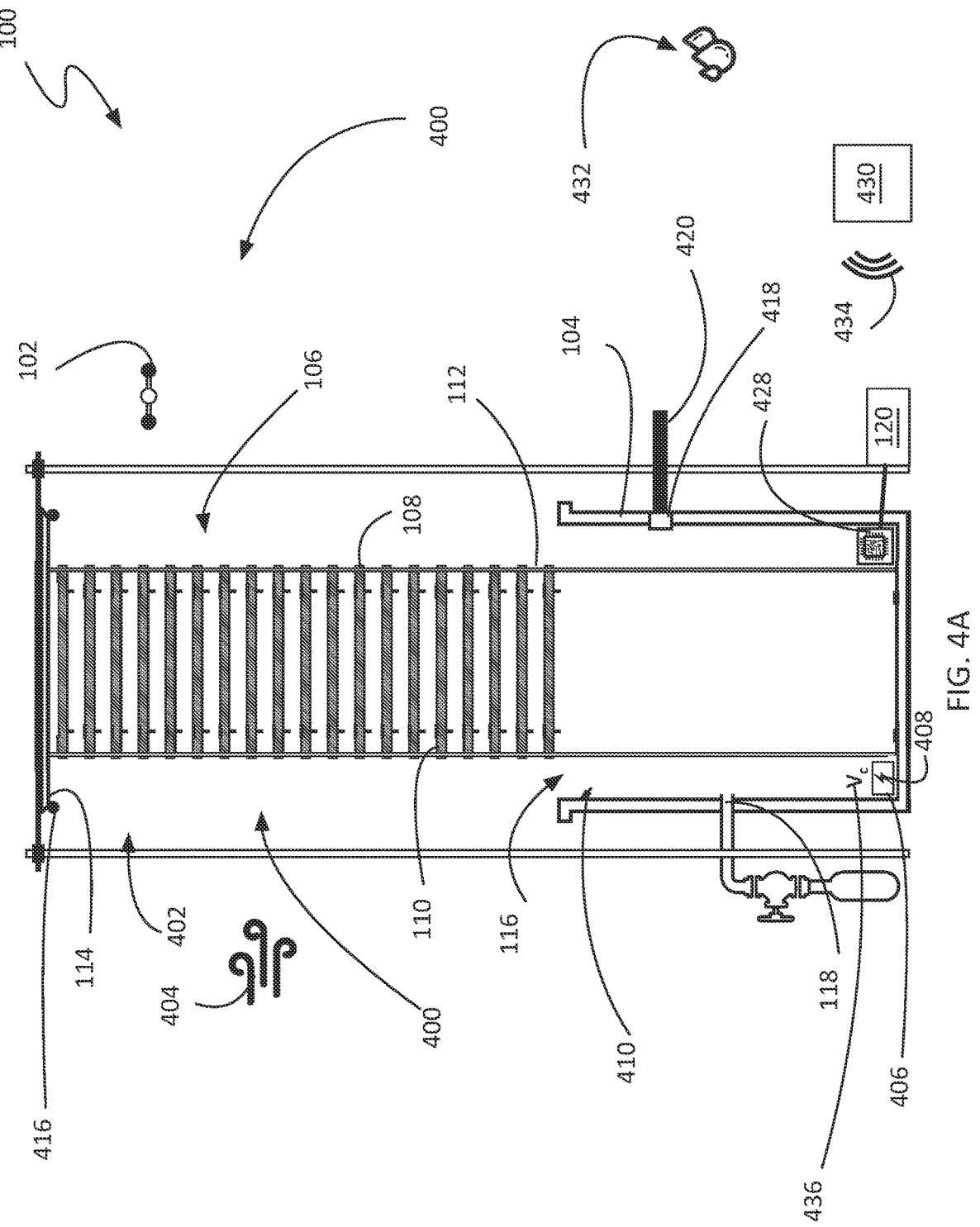
FIG. 4A is a side view of a device for passive collection of atmospheric carbon dioxide, with the capture structure in a collection configuration.

FIGS. 4A and 3B are side views of a non-limiting example of a collection device 100 with the capture structure 106 in a collection configuration 400 and a release configuration 412, respectively. A portion of the release chamber 104 has been removed to show the inside of the release chamber 104, which includes a sorbent regeneration system 600.

FIG. 4A shows the capture structure 106 is a collection configuration 400, which comprises the capture structure 106 extending upward from the release chamber 104, exposing at least a portion 402 of the capture structure 106 to an airflow 404. According to various embodiments, the ambient air makes contact with the sorbent material 110 of the capture structure 106 through natural air motion (e.g., wind), through induced flows (e.g., thermally induced flows, or flows induced by pressure drops obtained from channeling natural flows), through flows induced by blowers, fans or other mechanical systems, or through a combination of these or other methods known in the art.

Figure 4B:
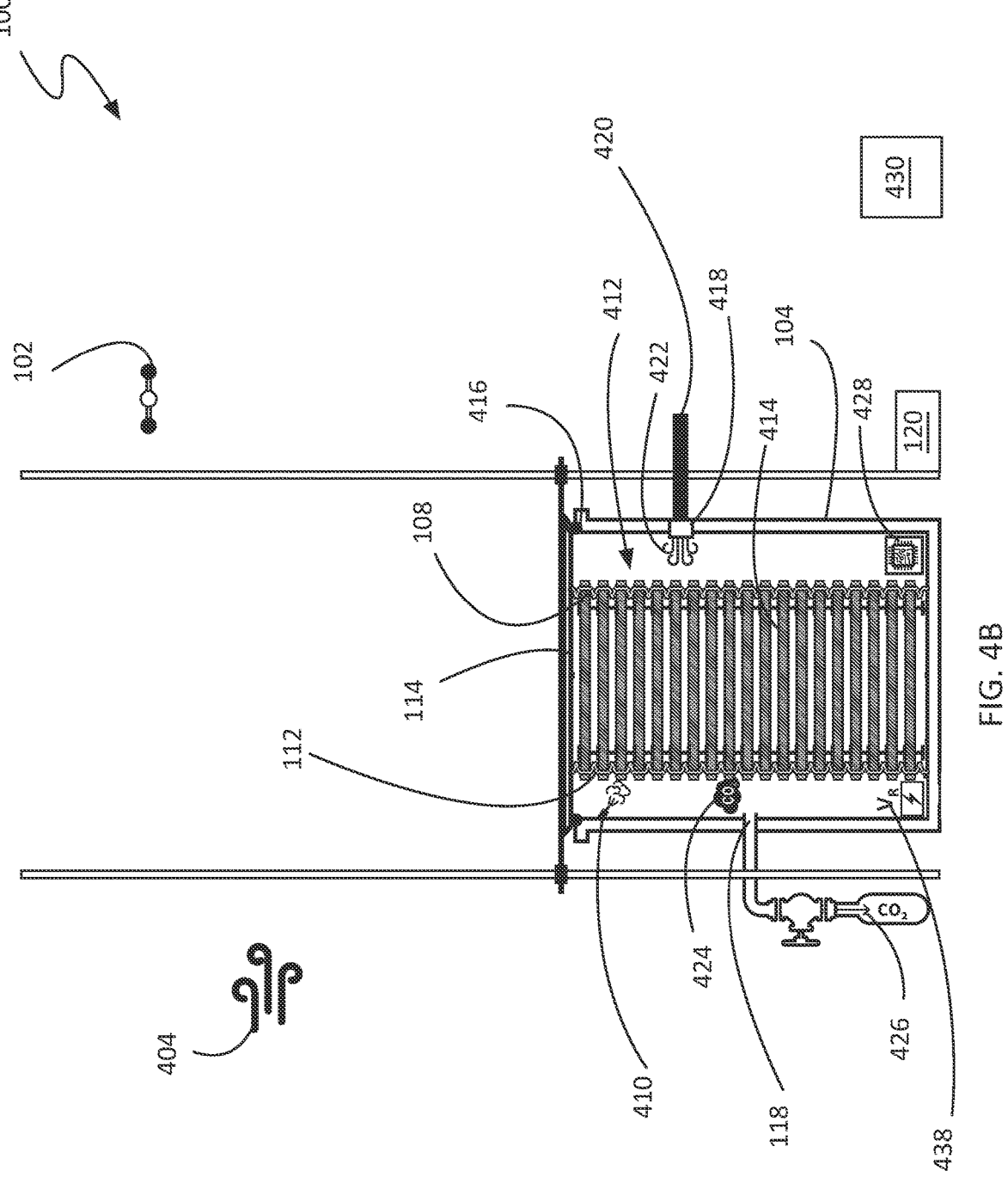
FIG. 4B is a side view of the device of FIG. 3A, with the capture structure in a release configuration.

FIG. 4B shows the collection device 100 of FIG. 4A with the capture structure 106 in a release configuration 412. In the context of the present description and the claims that follow, the release configuration 412 comprises the capture structure 106 (e.g., the plurality of disks 108 and the one or more collapsible supports 112) being enclosed within the release chamber 104, in anticipation for the regeneration of the sorbent material 110 and the collection of the captured carbon dioxide 414. As discussed above, the release configuration 412 may further comprise the lid 114 being coupled to, mated with, or sealed to the release chamber 104 such that the chamber 104 is sufficiently closed that the regeneration and collection may be accomplished.

When the capture structure 106, or a portion of the capture structure 106, is laden with $CO_2$ and has been moved into the release chamber 104, the sorbent material 110 is regenerated to release the captured $CO_2$ 414 into the release chamber 104. As previously discussed, this regeneration and release is accomplished by the sorbent regeneration system 406.

The following discussion of the regeneration or release phase of a passive collection device 100 is done in the context of an electro-swing sorbent material. However, it should be clear to those skilled in the art that the passive collection device 100, its capture structure 106 and release chamber 104, may be adapted for use with any of the above-mentioned sorbents and their associated regeneration processes. In some embodiments, heat may be used in conjunction with the electro-swing sorbent, which will amplify the release of carbon dioxide being driven by the applied release voltage 438. Discussing the use of electro-swing materials in the context of heat and moisture is illustrative of other embodiments using other sorbents. Such a discussion should not be interpreted as being limiting.

According to various embodiments, the sealed release chamber 104 may be filled with air, nitrogen, or other sweep gases 422, which may be provided from a sweep gas source 420 through a sweep gas inlet 418. The chamber 104 may also be evacuated, or partially evacuated, so as to remove most background gases. In some embodiments, the release chamber 104 may be evacuated or otherwise prepared before regeneration. The sorbent material 110 loads up on $CO_2$ in the open air, and releases $CO_2$ inside the release chamber 104. As a result, it is possible to minimize $CO_2$ losses during evacuation or other preparation steps, because the evacuation or these other steps occur before heat, moisture, and/or electric voltage are introduced.

In some embodiments, the release chamber 104 will be evacuated prior to changing the electric polarity, and water vapor will be introduced as sweep gas, or if it is available on the electrode surfaces, it is released from there. If the sorbent 110 does not need electric power during regeneration, the collection voltage 436 is maintained until the device 100 is ready for unloading. Once the voltage has been set for $CO_2$ release (i.e., release voltage 438), the $CO_2$ is collected in the release chamber 104 and drawn out by a vacuum compressor or other device able of lowering the pressure in the chamber and collecting the gas stream. The process stops, when the $CO_2$ partial pressure in the release chamber 104 reaches a minimum that is chosen to optimize overall performance. If the optimum release voltage depends on the loading state of the electrode surface, a control system can monitor and set the applied release voltage so as to optimize the release of $CO_2$ from the electrode surfaces.

In some embodiments, prior to reopening the chamber 104, a collection voltage 436 is once again applied, and any residual $CO_2$ is rebound to the sorbent. After this step is completed, the chamber 104 is filled with air, then the lid is opened, and the disks are raised again for another capture cycle.

In some embodiments, the product stream 426 may be formed by displacing the enriched gas 424 with a sweep gas 422 introduced to the inside of the release chamber 104. In some embodiments, the sweep gas 422 is water vapor, while in others the sweep gas 422 is atmospheric air, or another readily available gas.

Some embodiments may employ steam as a sweep gas 422, which may provide certain advantages. The use of steam provides an avenue for temperature manipulation within the regeneration chamber. Pumping in steam may increase the temperature, while pumping it out can deliberately cool the chamber and its contents. See, for example, the steam source 410 of FIGS. 4A and 4B.

In some embodiments, air can be removed from the chamber 104 prior to releasing the $CO_2$, in order to raise the fraction of the gas stream that comprises $CO_2$. Options may include application of a vacuum along with heat.

In some embodiments, the release chamber 104 may be at least partially evacuated during the regeneration or release phase. In these embodiments, it becomes important that the seal between the lid 114 and the release chamber 104 minimizes gas leaks to the inside. To this end, there may be a gasket 416 between the lid 114 and the top of the chamber 104. Attaching the gasket 416 to the bottom of the lid 114 may help protect it against accumulation of dirt. In some embodiments, this gasket seal may be augmented with, or replaced by, additional seals. For example, in some embodiments, the release chamber 104 may be sealed using a water seal, which will be discussed in greater detail with respect to FIGS. 7A and 7B, below.

During the regeneration of the sorbent 110, the $CO_2$ partial pressure is raised above ambient levels. In embodiments where the release chamber 104 is substantially evacuated, then the water vapor present can act as the sweep gas 422. This in turn implies that for the gas to flow from one chamber 104 to another, the temperature (and with it the water vapor pressure) needs to be adjusted from the channel the sweep gas 422 enters, to the channel through which the sweep gas exits. At a minimum, the temperature change must compensate for the pressure increase in $CO_2$ that occurs during the regeneration process.

In some embodiments, such as those where the release chamber 104 has the shape of a vertically aligned drum, a combined flow pattern could send the gas axially along an opening in the center of the capture structure (e.g. aperture 302 of circular disk 300, etc.), returning back along an annular region along the cylindrical wall of the chamber 104, and have at every horizontal level in the chamber 104 air flow radially from the center flow to the flow in the outside annulus. In such embodiments, the flow in the vertical sections sees very little flow resistance, whereas the radial connections dominate the flow impedance. As a result, each level sees the same pressure drop and thus will experience similar flow rates. The impedance to the flow can be maintained by creating walls with small openings around the inside flow cylinder and the outside flow path through the annulus. Other options include flows that move axially through main part of the chamber 104 and return through an annular cap between the sorbent stack material and the wall of the chamber 104.

In some embodiments, the released $CO_2$ may be gathered into a gas stream that flows through the release chamber 104. The gas may be recirculated over the sorbent by mechanical means. This gas could be dominated by water vapor and carbon dioxide, or contain most components of air, it also could include pure nitrogen, or any other gas chosen as a sweep gas 422. Furthermore, air flow through the chamber may be controlled by a pump, fan, or blower that introduces the heated air to the sorbent and another fan that extracts $CO_2$ rich air from the chamber.

After the $CO_2$ has been released from the sorbent material 110 of the capture structure 106 inside the chamber 104, it mixes to form an enriched gas 424. According to various embodiments, the enriched gas 424 is subsequently removed from the chamber 104 through a product outlet 118 as a product stream 426. In some embodiments, the product outlet 118 may be a valve, while in others it may comprise a pump. The product outlet 118 is in fluid communication with the inside of the release chamber 104.

As shown, the collection device 100 further comprises a control system 428. According to various embodiments, the control system 428 is responsible for the cyclical operation of the collection device 100. In the context of the present description and the claims that follow, the control system 428 is a device capable of executing a series of predefined instructions to cause the collection device 100 to operate in a cyclical manner, capturing $CO_2$ from the atmosphere and releasing it within the release chamber 104. Examples include, but are not limited to, embedded systems, conventional computer systems, mobile devices, and the like. The control system 428 is communicatively coupled with the various components that either provide information (e.g., sensors, etc.) or perform actions (e.g., actuator 120, the sorbent regeneration system 600, etc.). In some embodiments, the control system 428 may be responsible for additional functions. In some embodiments the control system 428 may provide automation for the collection device 100 that allows it to run unattended.

The collection devices 100 may further comprise one or more sensors 430 (e.g., $CO_2$ sensors, humidity sensors, temperature sensors, air flow sensors, voltage/current sensors, light sensors, etc.) coupled to a processor configured with algorithms for efficient operation of the device 100. Some sensors 430 may monitor conditions outside of the collection device 100 (e.g., observing weather conditions that may affect the operation of the device, etc.), while other sensors 430 may observe the operation of the device 100 itself (e.g., level of carbon dioxide within the release chamber, voltage or current applied across one or more disks, temperature within the release chamber, etc.). The passive collection device 100 may further comprise actuators 120 or other means of performing mechanical work, for the raising and lowering of the capture structure 106. The passive collection device 100 may also comprise communication equipment for remote monitoring and operation. In some embodiments, the passive collection device 100 may be configured for autonomous operation, adapting to ambient conditions 432 as needed. Power may be supplied for all operations of the device directly, via battery or municipal source, or from a renewable source such as, for example, solar, wind, or thermoelectric. According to various embodiments, this power is supplied through the power supply 408 of the sorbent regeneration system 406.

According to various embodiments, one or more measurements may be performed using the sensors 430, with the signals 434 being observed by the control system 428. These measurements may include, but are not limited to, wind speed and other weather data, humidity both internal to the chamber and external, time, $CO_2$ off-take gas percentage, internal temperature of the chamber 104, flow speeds (to detect blockages), operational failure of components and/or instability during operation, external and internal temperatures, and the like. Using this information, the control system 428 may be configured to perform one or more operations in response to detected ambient conditions or internal conditions. These operations may include, but are not limited to, instructions to lower the disks 108 due to high winds or excessive moisture, timed instructions to raise or lower the disks 108 to vary exposure time, starting, stopping, increasing or decreasing flow rates, extend or reduce time in the release chamber 104 depending on $CO_2$ loading, and the like.

Some embodiments of the passive collection device 100 may employ algorithms developed to produce the best response from the sorbent 110. These algorithms are designed to operate electro-swing applications in an efficient manner. These algorithms optimize the balance between performance and operational cost, so that applied voltages are deployed to optimize $CO_2$ delivery at an optimal rate and optimal partial pressure. According to various embodiments, optimization may account for ambient temperatures, the loading state of the sorbent 110, weather conditions, the cost of electricity, and other relevant parameters. In some embodiments the temperature of release of $CO_2$ in the chamber 104 may be targeted to be elevated over the ambient temperature. The optimal temperature depends on environmental conditions and the heat tolerance of the material in question, and could also be affected by the cost of the available heat. In a specific embodiment, the range is between ambient temperatures and 150° C., but may be preferable to operate in a range between 45 and 50° C., depending on the sorbent. For many sorbents, this temperature range is still sufficient, and the cost of the heat is relatively small.

According to various embodiments, the control system 428 may further comprise, or be instructed by, an artificial intelligence system 417 (AIS) that observes the performance of the device 100 and adapts its performance in an iterative fashion to maximize output, and to learn optimizations which will differ with weather conditions and the physical state of the device 100. This AIS 417 will improve efficiency, reduce energy costs and reduce maintenance. For example, the AIS 417 coupled to the device's 100 control system 428 may "learn" that certain alarms are not critical and will adjust and provide notice to the operation of the particular alarm. Reduction of alarms that require response would be a major contributor to reduced operational costs.

The control system 428 may make use of software configured to control one or more operations or properties, including but not limited to internal temperature, flow rate of sweep gas, pumping rate to pull product gas out, timing of exposure to air, time within release chamber 104, and the like. The software may be configured to optimize various properties, such as yield, water consumption, and/or energy consumption.

Automated system may further include, but are not limited to, wind/weather measurement and response, $CO_2$ collection monitoring, automatically timed movement of the capture structure 106 and/or support structure 108, water and air control systems, temperature measurement & control, internal flow measurement, timing controls to match the function of other system, and the like.

In some embodiments, the passive collection device 100 may further comprise a series of baffles to modify airflow and/or shelter various aspects of the device 100. In the context of the present description and the claims that follow, a baffle is a structure having at least one surface that at least partially obstructs air flow, allowing it to redirect or focus air flow. Some baffles may also at least partially obstruct light, and may be used to shelter sensitive sorbent materials. Examples include, but are not limited to, sails, walls, fins, wings, and the like. Some baffles may be rigid, while others may be flexible, or comprise a flexible surface mounted on a rigid frame. Some embodiments may use baffles to introduce or enhance turbulence in local air currents, to increase exposure to the sorbent materials.

According to various embodiments, baffles may be employed in a variety of contexts. In some embodiments, one or more baffles may be used external to a capture device 100. See, for example, the baffles 608 shown in FIG. 6, which will be discussed further, below. In other embodiments, one or more baffles may be implemented within, or as a part of, a capture device 100. For example, in one embodiment, the disks 108 may have one or more baffles above and around a central aperture 302 to promote and/or control airflow. In another embodiment, baffles may be used on the disks 108 to protect the sorbent material 110 from exposure to damaging UV light. Additionally, baffles may be used on the disks 108 such that, when the capture structure 106 is in the collection configuration 400, air turbulence is increased, and airflow is directed at the sorbent 110.

In some embodiments, the baffles may be articulated, and may further be mechanized and programmatically movable to respond to different ambient conditions. In some embodiments, there may be baffles within the chamber 104, at the bottom and along the sides, to enhance air flow and moisture distribution. In other embodiments, however, the passive collection device 100 may not employ baffles at all.

The following discussion is meant to exemplify rather than limit the operation of a passive collection device 100 employing sorbent disks 108, according to one embodiment. The passive collection device's 100 working cycle begins from a closed position with all sorbent disks 108 inside the release chamber 104 and empty of $CO_2$. (Empty in this context means lean; there may be residual $CO_2$ on the sorbent) The lid is pulled up by an actuator 120, raising all disks 108 that move from the chamber, where one disk 108 rests on the next, to a collection configuration 400 where the disks 108 all hang from at least one collapsible support 112. When the lid 114 reaches the topmost position, all sorbent disks 108 are exposed to air movement. A gap exists between the disks 108 so that air can flow across all disks 108, starting the capture phase. Based on the climatic conditions and the electro-swing sorbent choice, the exposure time of the $CO_2$ capture phase can vary. With some electro-swing sorbents, a After exposure, the lid 114 is lowered again. As soon as the lid closes the release chamber 104, collection begins. The applied voltage is changed, depending on the type of electro-swing sorbent 110 used. The air in the chamber is now enriched with $CO_2$, which is pulled out through a product outlet 118. Once the disks 108 have been emptied, they are raised again, and the sorbent 110 begins the cycle of collecting $CO_2$ from air. To avoid the gradual decline in the $CO_2$ concentration in the product stream 426, it is possible to gang together a number of collection devices 100, where the sweep gas from a nearly empty passive collection device 100 enters a passive collection device 100 with a still higher equilibrium concentration of $CO_2$.

The following is a non-limiting example of the potential performance of one embodiment of the device 100 contemplated herein. Direct air capture has a hard time getting to high $CO_2$ fluxes. The reason is simple, there is not much $CO_2$ in the air. And it is hard to avoid a thin boundary layer of air on the surface of the material. Diffusion through that layer takes time. For example, a boundary layer might be a few millimeters. At this point the flux is limited to the $CO_2$ density in air times the diffusion constant divided by the thickness of the layer. In terms of numbers this is $1.6e{-}2$ mol/m3*$1e{-}5$ m$^2$/s*$1/0.003$ m or 50 micromol/m$^2$/sec, though it is possible to achieve results that are better by an order of magnitude.

To put this in perspective, the electric charge that needs to flow is on the order of 200,000 Coulomb per mole, or 0.2 Coulomb per micromole. A micromole per second would operate with a current of 0.2 A per square meter. A device like this could therefore support a current of about 10 Ampere per square meter of surface. In some embodiments, this might be pushed to 100 Ampere per square meter. Most electrochemical devices range about 0.1 to 5 Amp/cm2, which in these units is between 1000 and 50,000 A/m$^2$. At 50 micromole per square meter per second, a square meter collects in the course of a year 30*50 mole (30 million seconds in a year). This would yield 1500 mole or about 70 kg in a year.

To set the scale, the wind cross section of a single disk in some examples could be 1.50 m by 0.04 m. At a flow speed of 1 m/s such a disk could be 0.06 m3/s. Assuming 40 moles of air per cubic meter, we have a $CO_2$ density of 0.016 mol/m3 or a total flow of 1 mmol/s. At 50 kJ/mol of energy requirement, this would suggest 50 W of power requirement per disk, and for a 1000 second run this would require 50,000 J or 14 W-hours. This could easily yield 0.5 kg. Put another way, a 10 Volt battery would need to be able to maintain 5 A current for 1000 Seconds. In practice, this may be three times smaller because the collection efficiency is not likely to be 100%. Moreover, a good fraction of the power demand may occur during regeneration, while in this non-limiting example it is just combined on the collection side. The amount discussed here is equivalent to 7 kg per stack of disks, per cycle.

Passive collection devices 100 may stand alone, or they may be the backbone of a larger air capture system, such as a passive collection cluster 602 made up of two or more integrated collection devices 100, or a passive collection system 600 comprising at least one cluster 602. A complete passive collection system 600 could be built around two collection devices 100 or may comprise a complex inter-connected network of thousands of collection devices 100. In one embodiment, an interconnected system of 5 to 20 collection devices 100 makes a passive collection cluster 602, while in other embodiments a cluster 602 may simply be two devices 100 working in harmony. In some embodi-ments, passive collection clusters 602 may be skid mounted blocks that comprise a self-contained system but that may also be field erected.

Figure 5A:
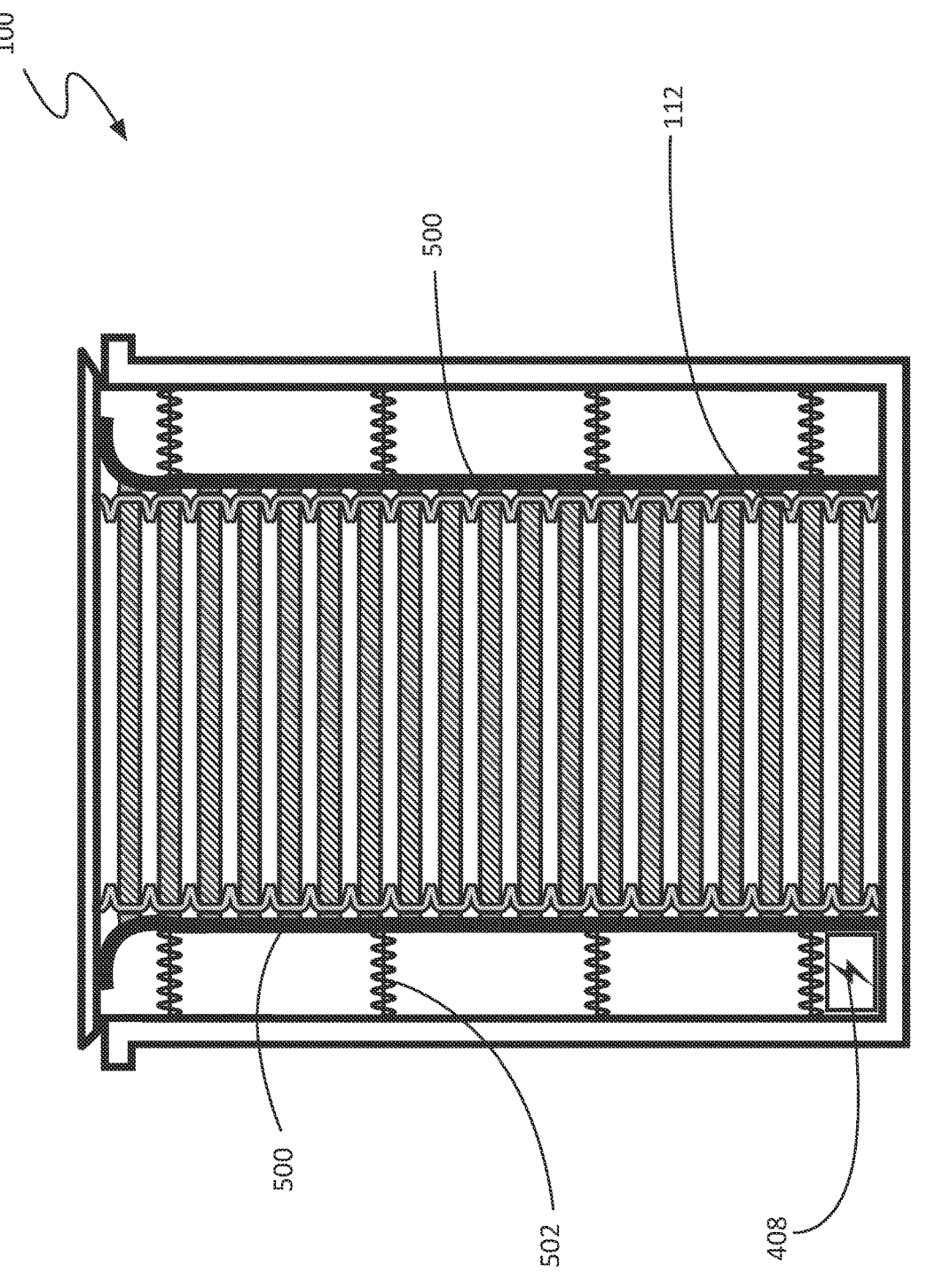
FIGS. 5A and 5B are cross-sectional side views of other embodiments of a collection device having electro-swing sorbent materials, in the release configuration.
Figure 5B:
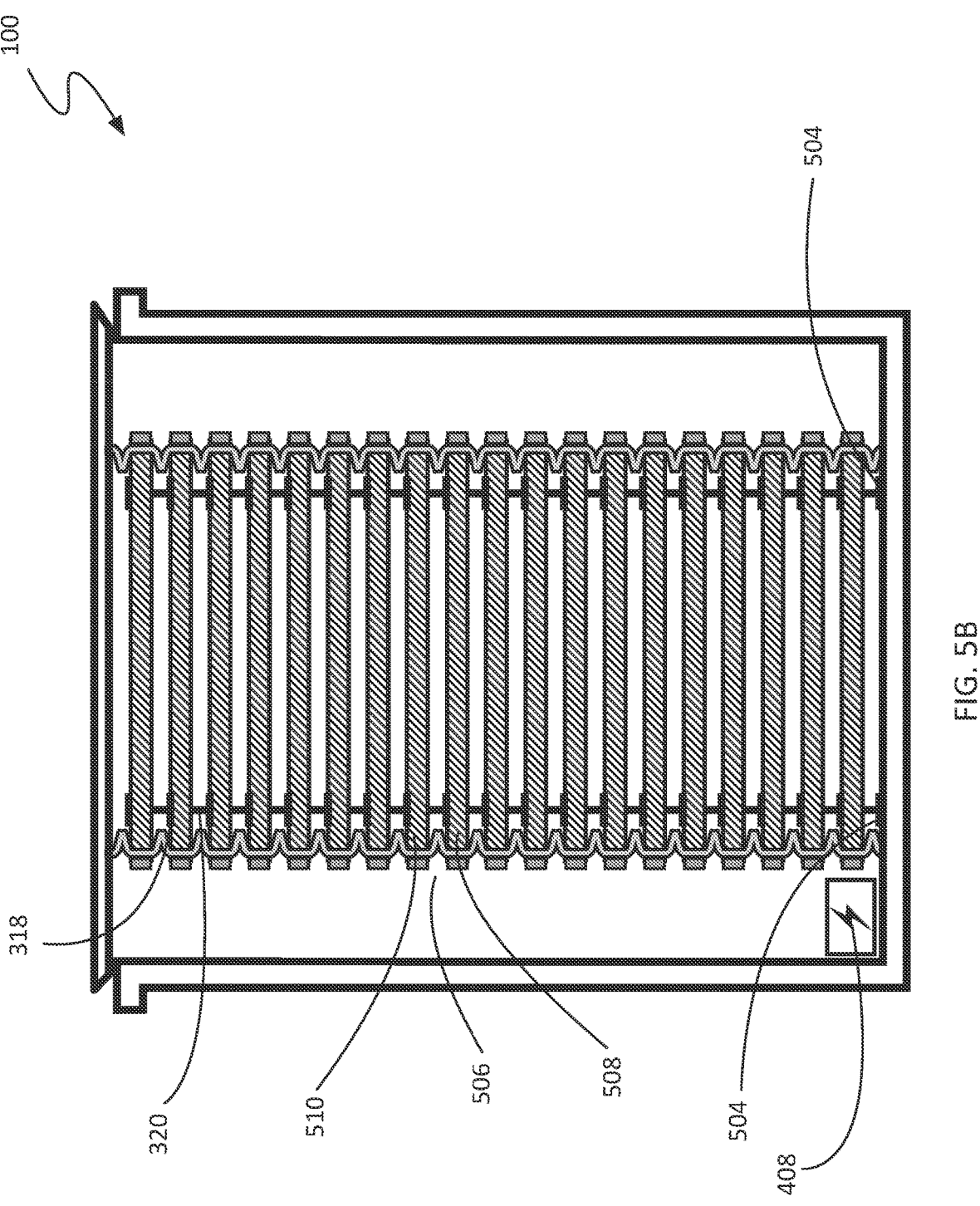

FIGS. 5A and 5B are cross-sectional side views on non-limiting examples of passive collection devices 100 using electro-swing sorbent materials 110, in the release configuration 412. Specifically, FIGS. 5A and 5B show non-limiting examples of two embodiments providing power to the plurality of disks 108 in different ways. As shown, the release chamber 104 of the device of FIG. 5A has a pair of power rails 500 that are communicatively coupled to the power supply 408 of the sorbent regeneration system 406. In the context of the present description and the claims that follow, a power rail 500 is a rail or otherwise rigid structure that is conductive and runs the height of the disks, when they are stacked. The disks draw power from the pairs of power rails (paired to provide positive and negative terminals) by being in direct contact with them. In some embodiments, the disks make contact with the power rails 500 as soon as they enter the release chamber 104, and maintain that contact as they slide downward. As an option, and as shown in FIG. 5A, the power rails 500 may be coupled to the release chamber 104 through a number of biasing elements 502 (e.g., coil springs, leaf springs, arc springs, etc.) that maintains a slight pressure on the connec-tion between the rail and the edge contact.

While this has the advantage of minimizing the number of moving parts, it requires a low friction interface between the rails 500 and the edge contacts 340. Unwanted material on either surface could wear down that connection until it fails to provide the needed power.

In other embodiments, the electrical contact between the rails and the edge contacts may be initiated after the disks are in place, and be accomplished through the secondary movement of the rails and/or the disks or a portion of the disks. As a specific example, in one embodiment, the rails 500 may be biased toward the disks 108, but not released until the disks 108 are in the release configuration 412.

FIG. 5B shows a device at a similar phase of the regen-eration cycle as FIG. 5A. However, as shown in FIG. 5B, the power is being provided to the plurality of disks 108 using the disks 108 themselves as a means to transmit power to the entire stack. As shown, within each neighboring pair 506 of disks there is an upper disk 510 and lower disk 508. All of the disks have at least one pair of electrical contacts 318 and at least one pair of conductive posts 320. In the context of the present description and the claims that follow, a conductive post 320 may be any conductive structure or mate-rial that extends outward from a disk and through which electricity may conducted to the sorbent material of that disk, and to the electrical contact to pass to the next disk.

As shown, pairs of contacts and posts are aligned such that the posts 320 of the upper disk 510 are communicatively coupled to the contacts of the lower disk 508 when the disks 108 are stacked inside the release chamber 104 as part of the release configuration 412. The bottom most disk's posts 320 rest on base electrical contacts 504 deposed on the floor of the release chamber or some other structure beneath the capture structure. The base electrical contacts 504 are com-municatively coupled to the sorbent regeneration system 406 and its power supply 408. When the disks are stacked in the release configuration 412, the entire stack is able to receive power from the power supply 408 through these connec-tions, according to various embodiments.

Figure 6:
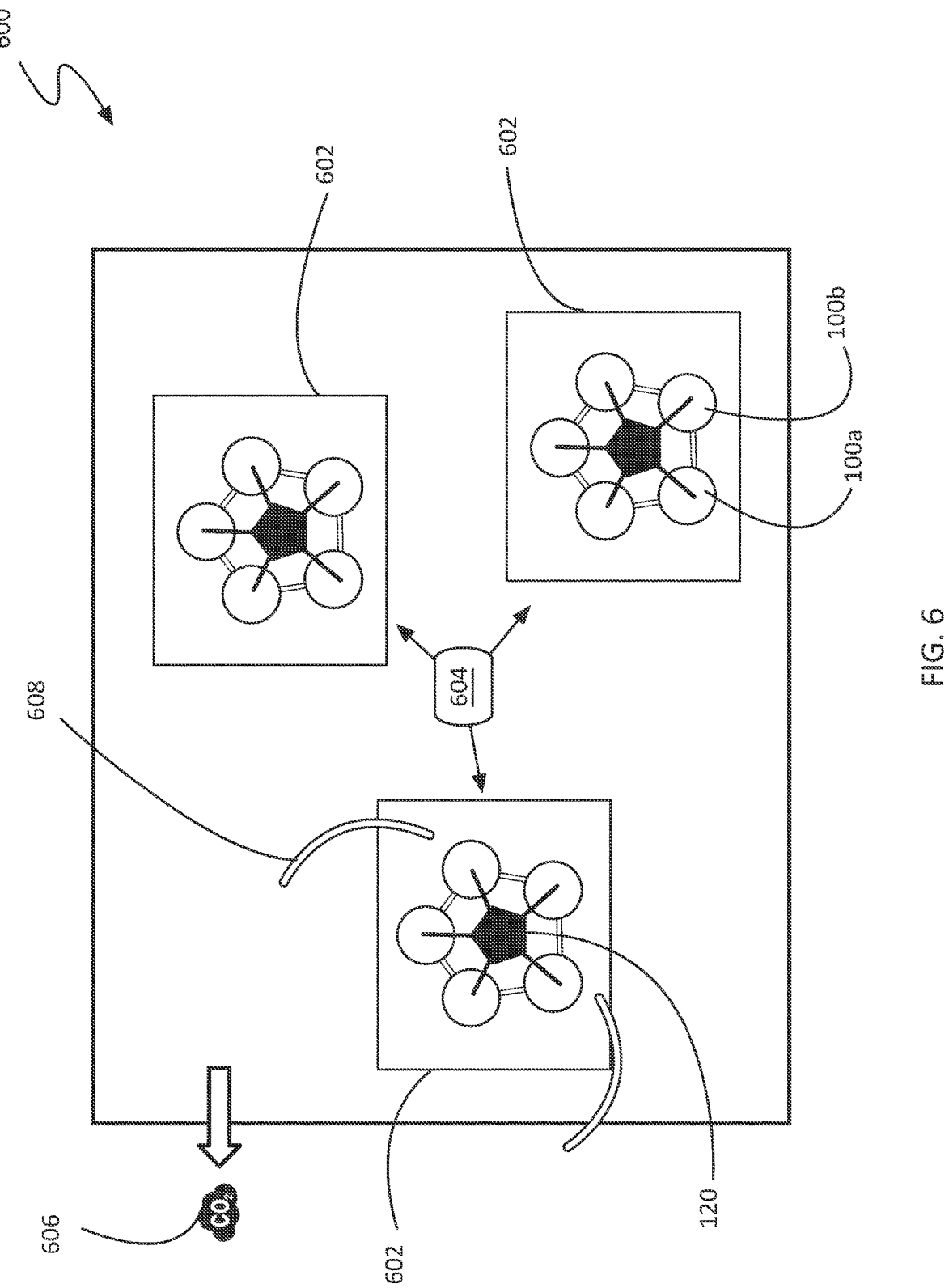
FIG. 6 is a schematic view of a system for passive collection of atmospheric carbon dioxide comprising multiple passive collection clusters.

FIG. 6 is a schematic view of a system 600 for passive collection of atmospheric carbon dioxide comprising mul-tiple passive collection clusters 602. In the context of the present description, a passive collection system 600 is a combination of collection devices 100, or single collection devices with associated hardware, connections, control sys-tems and software for internal processing and additional equipment, control systems and software to post process the output of the collection devices 100, and the like. For the sake of differentiating a system 600 from a cluster 602, a system 600 is made up of at least one cluster 602, but a cluster 602 is made up of at least two devices 100. Further-more, a passive collection system 600 is a set of collection devices 100 that are particularly tightly connected and organized in one or more clusters 602. For example, they could be tied together in a single skid-mounted container-ized subsystem. The use of the term system and cluster partially overlap. Passive collection clusters 602 are typi-cally more tightly connected than passive collection systems 600.

Collection devices can be interconnected into a passive collection system 600 that, by coordinating regeneration, can create a nearly continuous product stream 606. This continuous product stream 606 can be enhanced by sweep-ing product gas from nearly empty units through units that still show higher loading. For example, in one embodiment, a collection device 100a in a cluster 602 may be nearly empty and have its product gas swept into a neighboring collection device 100b (in the same cluster 602) that has a higher loading. Devices 100a and 100b are in fluid commu-nication with each other (e.g., device 100b is in fluid communication with the product outlet 118 of device 100a), and in a sense share a sweep gas source.

The use of a passive collection system 600 or cluster 602 may provide a continuous product stream 606, which is flexible and can adjust to varying weather and climate conditions. In some embodiments, the system 600 and/or cluster 602 may comprise a control system 604, which may be in place of, or operate alongside of, the control system 428 of individual devices 100. The control system 604 may be configured to operate devices in series to cause the continuous operation of such a system 600, making it possible to efficiently upgrade $CO_2$ from 600 parts per million as is typical for ambient air, to several percent, ranging from 1 to 10%. The advantage of the systems and methods contemplated herein is that they can minimize energy cost and operate optimally under varying conditions. It should be noted that the control system 604 of a cluster 602 or system 600 may perform all of the operations and measurements contemplated for the control system 428 of an individual device 100, as discussed above.

In some embodiments, the individual collection devices 100 of a passive collection system 600 may be held in place by various means and interconnected in a way that makes it possible to enriched gas 424 from one passive collection device 100 through a sequence of collection devices 100 that are regenerating. The gas handling, water, steam or power handling connections may be switched as needed between all or subsets of the collection devices 100. As an option, collection devices 100 can be organized in a hierarchical structure of individual collection devices 100, clusters 602 of collection devices 100, clusters of clusters, systems of cluster, and so forth.

A passive collection system 600 may comprise a system of process units to flow sweep gas through the collection devices 100, or alternatively a system of process units to evacuate collection devices 100 and pull $CO_2$ out of them. These process units may include piping, pumps, fans, valves, sensors, actuators, control software and other components necessary for the interconnection of the collection devices 100. Furthermore, the passive collection system 600 may include a system of piping and valves to deliver water to the collection devices 100, to recover wastewater, and/or to recover and recirculate water.

Some passive collection systems 600 and/or clusters 602 may comprise shared resources. For example, as shown in FIG. 6, in some embodiments multiple passive collection devices 100 may share the same actuator 120 to move their respective capture structures 106 between the collection configuration 400 and the release configuration 412. This actuator 120 may be shared between multiple devices 100 using mechanical devices like gears, arms, pulleys, and/or any other mechanical device known in the art.

In some embodiments, a passive collection system 600 may comprise a shared system for delivery of electrical power to multiple collection devices 100, while in others, each passive collection device 100 may have its own source. Passive collection systems 600 may also comprise support structures that hold multiple collection devices 100 in place. The support structures may include, but are not limited to, foundations, tent like structures to hold up the superstructure for lifting and lowering the capture structures 106, protection against sunlight, and panels to guide the wind in various ways through the system.

As shown in FIG. 6, in some embodiments, a passive collection system 600 and/or clusters 602 may further comprise one or more baffles 608 to redirect air currents for increased exposure to the sorbent materials of the capture devices 100. In some embodiments, these baffles 608 may be articulated, and may be configured to adjust to changes in ambient conditions (e.g., wind direction, position of the sun in the sky, weather, etc.). The purpose of these panel or sail like structures is to guide wind either to or away from a passive collection device 100 so as to increase the operating range of a passive collection device 100 with regard to wind speeds. At low wind speed air would be funneled to the passive collection device 100, at high wind speed it would be deflected away.

Additionally, some passive collection system 600 and/or clusters 602 may employ automated systems. Automated system may include, but are not limited to, wind/weather measurement and response, $CO_2$ collection monitoring, automatically timed movement of the disks 108 and lid, water and air control systems, temperature measurement & control, internal flow measurement, timing controls to match the function of other collection devices 100 in the same system or cluster, blow down control, and any other automations contemplated herein for individual devices 100.

In some embodiments the device 100 or a cluster 602 of collection devices 100 may be raised above other equipment. This will be done either to reduce the footprint and land use and/or to enhance collection as in some geographies having the collection higher will increase air flow.

In some embodiments, the passive collection system 600 may include panels for wind guidance. The purpose of these panels or sail like structures is to guide wind either to or away from a passive collection device 100 so as to increase the operating range of a passive collection device 100 with regard to wind speeds. At low wind speed air would be funneled to the passive collection device 100, at high wind speed it would be deflected away. Said panels may also be used with single collection devices 100, outside the context of a system 600 or cluster 602.

According to various embodiments, a passive collection system 600 also comprises electrical, sensor and control systems that power and manage the collection devices 100. Some passive collection systems 600 also comprise an upgrade system for improving the quality of the product stream 426. In some embodiments, passive collection systems 600 may be configured to deliver a dry $CO_2$/air mixture with $CO_2$ concentrations ranging from 0.1% to 95% or higher. Some passive collection systems 600 may employ a system to bind $CO_2$ to a second sorbent from which pure $CO_2$ may be produced. Other passive collection systems 600 may use a system that starts from a low-pressure stream of what amounts to nearly pure $CO_2$ and water vapor, which is then dried and compressed so as to produce a pure concentrated stream of $CO_2$. In still other passive collection systems 600, a system that dissolves $CO_2$ into a carbonate/bicarbonate solution may be used. Some passive collection systems 600 may make use of multiple systems for upgrading system output. However, it should be clear to those skilled in the art that collection devices 100 and systems 600 are designed to collect $CO_2$ from the atmosphere and present it in a form useful for a downstream application. They are in no way limited by the choice of sorbent material or the intended downstream application.

Some embodiments may evacuate the release chamber 714 as part of the regeneration process, creating a low-level vacuum within. According to various embodiments, the maintenance of this vacuum is facilitated by a seal formed between the lid 114 and the release chamber 714. As discussed above, in some embodiments, this seal is formed using a gasket 416 located between the lid 114 and the release chamber 714. In other embodiments, the seal may be a water seal.

Figure 7A:
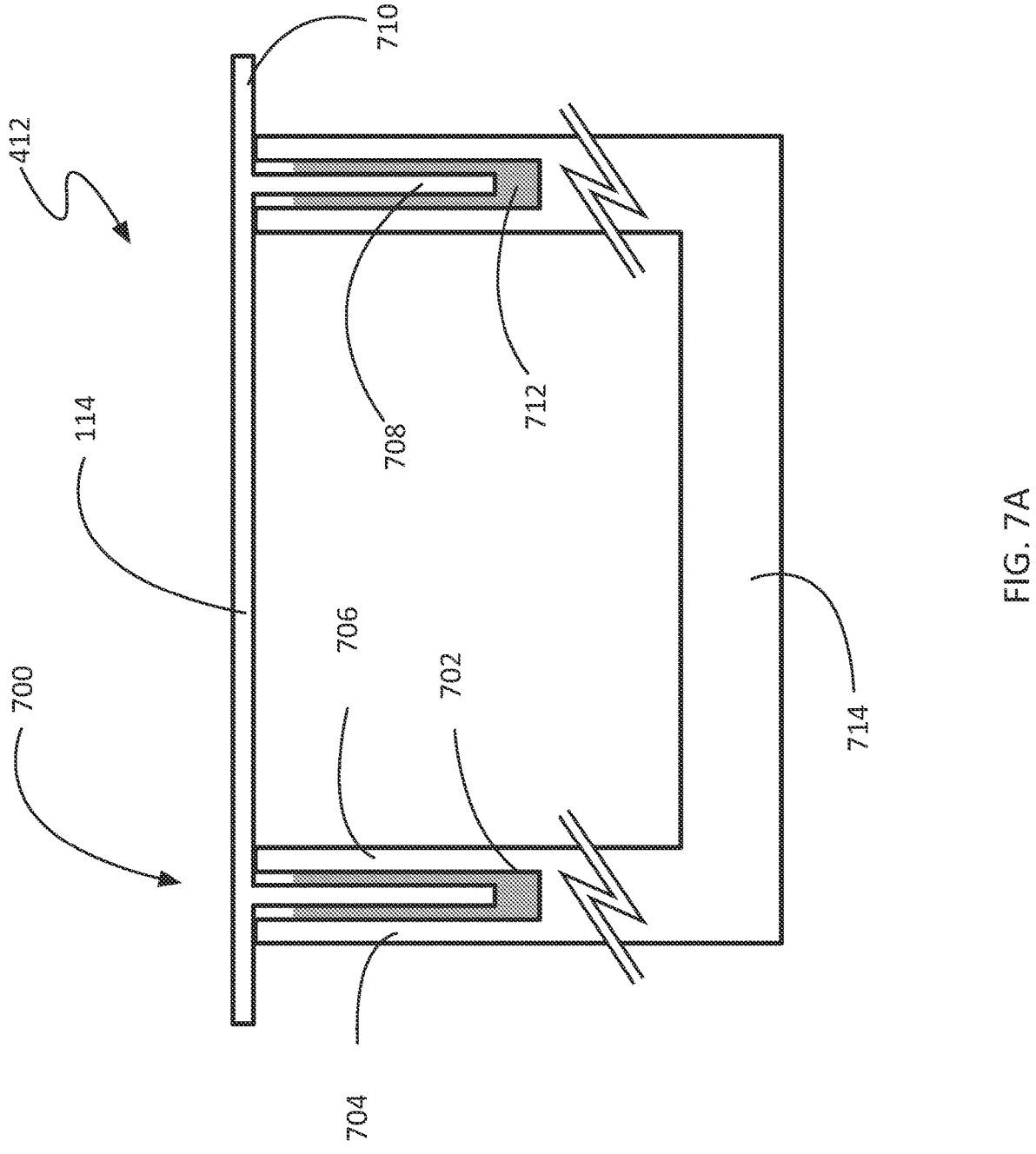
FIGS. 7A and 7B are side and top views of a water seal lid for a device for passive collection of atmospheric carbon dioxide.
Figure 7B:
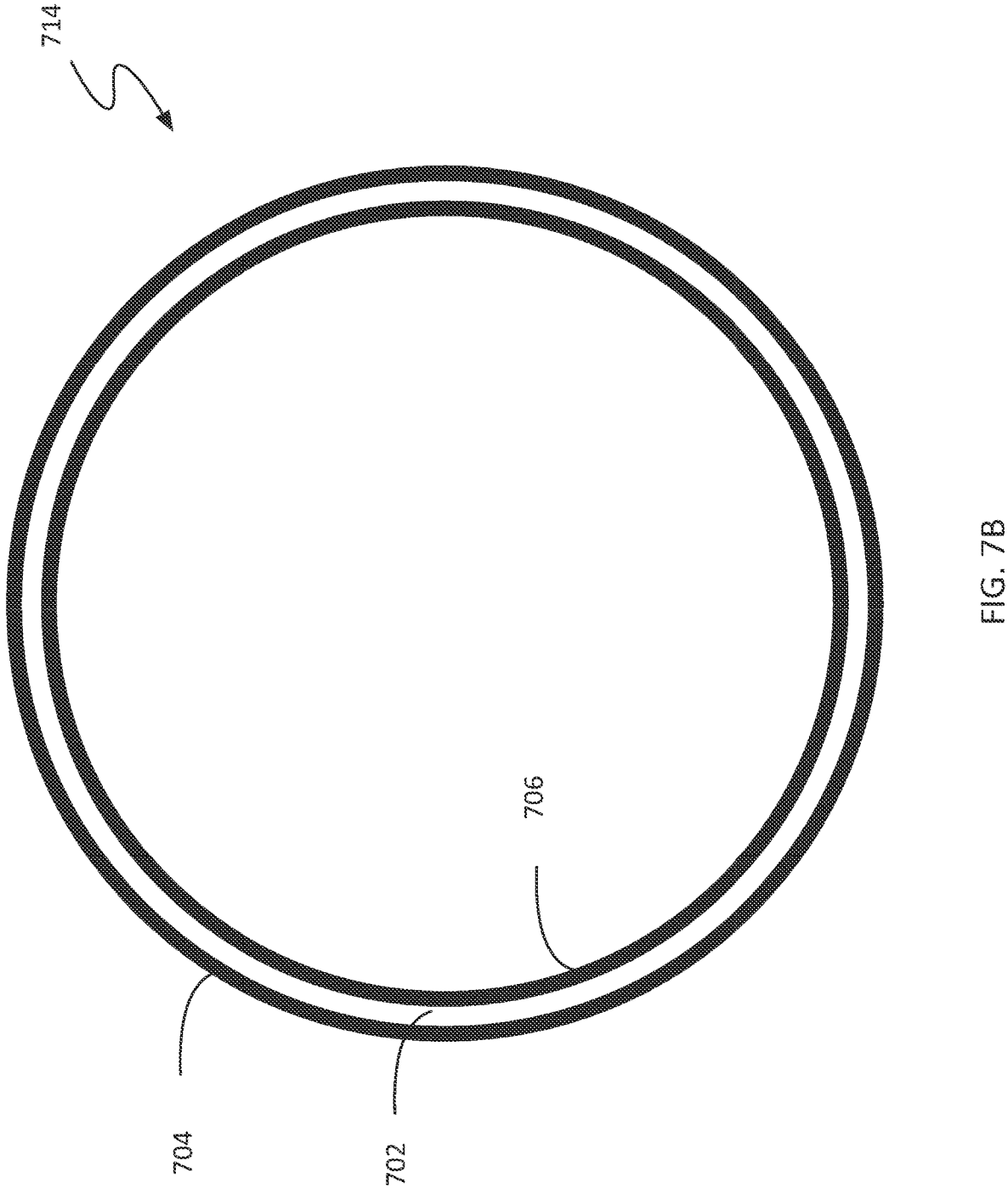

FIGS. 7A and 7B are cross-sectional and top views of a non-limiting example of an embodiment making use of a water seal 700. Specifically, FIG. 7A is a cross-sectional view of a release chamber 714 and lid 114 in the release configuration, taken along a central axis. FIG. 7B is a top view of the release chamber 714 of FIG. 7B, without water 712.

As shown, the release chamber 714 comprises a trough 702 along the upper rim, creating a void between the inner wall 706 and outer wall 704 of the release chamber 714. The lid 114 comprises a seal spike 708 sized to fit inside the trough 702, leaving a small amount of space for water 712 between the spike 708 and inner/outer wall 704$s$ of the release chamber 714. The water 712 inside the trough 702 effectively prevents air from entering the closed chamber, as the resistance to flow is much larger for a liquid than for the gaseous atmosphere.

The use of a water seal 700 provides a number of advantages over conventional seals, such as a gasket seal 416. Leaks are easier to detect with a water seal. Additionally, water seals are more robust against the introduction of foreign objects. Various embodiments of the contemplated capture device may be deployed in remote locations; due to the high efficiency of the contemplated device, it may be left to operate autonomously, automatically opening and closing the release chamber 714 as part of the capture/release cycle. However, it is likely that while the chamber is open, debris may fall or be blown onto the rim of the chamber 104. The effectiveness of a gasket 416 seal may be significantly diminished by the introduction of a foreign object, even a very small one. This may decrease the length of time a capture device may be left to run autonomously, increasing the amount of service needed, and thus cost of operation.

However, a water seal 700 is better able to deal with the inevitable introduction of debris. Whether the debris is submerged or floating, the seal provided by the water 712 is not compromised by these foreign objects, unless they are large enough, separate or combined, to interfere with the insertion of the spike 708 into the trough 702. For example, if the debris is larger than the gap between the spike 708 and the walls of the trough 702, it may interfere with the lid 114 completely closing. In some embodiments, the space between the release chamber 714 and the bottom of the spike 708 may be increased to allow for larger amounts of debris before human intervention is needed.

The spike depth and the water trough size may vary based on a number of parameters including, but not limited to, release chamber diameter, the vacuum pressure, various properties of the release chamber material (e.g., coefficient of thermal expansion, flexibility, tendency to warp over time, etc.), and/or anticipated environmental conditions of the site where the capture device is to be utilized. As a specific, non-limiting example, in one embodiment, a five-inch spike 708 may be paired with a six inch deep trough 702. In another embodiment, where the release chamber 714 is composed of metal and manufactured with higher tolerances, the spike 708 and trough 702 may be smaller, while in still another embodiment where the release chamber 714 and lid 114 are made of fiberglass, the spike 708 and trough 702 may be larger.

As shown, in some embodiments, the lid 114 may extend beyond the release chamber 714, forming a lip 710. In some embodiments, this lip 710 may be several inches. In other embodiments, the lip 710 may be roughly the same order of magnitude in size as the spike 708 depth. As an option, in some embodiments, the lip 710 may extend downward to form a better fit with the release chamber 714 outer wall 704. Of course, in other embodiments, the lid 114 may be without a lip 710.

According to various embodiments, the water 712 level within the trough 702 is maintained at a particular level, or within a particular range. For example, in some embodiments, the water 712 level may be maintained to minimize the amount of overflow when the spike 708 is inserted, while maximizing the amount of water 712. In other embodiments, the trough 702 may be maintained at half-full. The trough 702 retains water 712 through operating cycles, but also may have a means for replacing water 712 lost due to evaporation. In some embodiments, water 712 may be added to the trough 702 through a small pump and water 712 line incorporated into the release chamber 714. In some embodiments, the water 712 for the trough 702 may be sourced from the same supply used for sorbent regeneration (e.g., moisture swing sorbent).

In some embodiments, water 712 may be added to the trough 702 when it is determined that the water 712 level is outside a predefined range. For example, in one embodiment, one or more water 712 sensors may be used to determine the water 712 level. In other embodiments, water 712 may be added to the trough 702 at regular intervals, or in amounts and/or intervals that may change depending on the ambient conditions observed by the sensors discussed above, used to modify the operation of the collection/regeneration cycles.

In some embodiments, the water seal may be used alone, while in other embodiments, it may be used in combination with a gasket 416, as previously discussed. In still other embodiments, the water seal may be used with other sealing techniques known in the art.

Where the above examples, embodiments and implementations reference examples, it should be understood by those of ordinary skill in the art that other passive collection devices, systems and methods and examples could be intermixed or substituted with those provided. In places where the description above refers to particular embodiments of passive collection devices, systems, and methods, it should be readily apparent that a number of modifications may be made without departing from the spirit thereof and that these embodiments and implementations may be applied to other carbon dioxide collection devices, systems, and methods as well. Accordingly, the disclosed subject matter is intended to embrace all such alterations, modifications and variations that fall within the spirit and scope of the disclosure and the knowledge of one of ordinary skill in the art.

What is claimed is:

1. A device for passive collection of atmospheric carbon dioxide, comprising:

a release chamber comprising an opening, a sorbent regeneration system having a power supply, and a product outlet;

a capture structure coupled to the release chamber and comprising at least one collapsible support and a plurality of disks coupled to and spaced along the at least one collapsible support, each disk comprising an electro-swing sorbent material, and the capture structure being movable between a collection configuration and a release configuration;

a lid covering the opening of the release chamber when the capture structure is in the release configuration; and wherein the collection configuration comprises the capture structure extending upward from the release chamber to expose at least a portion of the capture structure to an airflow and allow the sorbent material of the plurality of disks to capture atmospheric carbon dioxide while, in each disk of the plurality of disks, a collection voltage is established across the electro-swing sorbent material;

wherein the release configuration comprises the at least one collapsible support of the capture structure being collapsed, the lid covering the opening of the release chamber, and the plurality of disks enclosed inside the release chamber and conductively coupled to the power supply of the sorbent regeneration system such that plurality of disks receive power and a release voltage is established across the electro-swing sorbent material of each disk, resulting in the release of captured carbon dioxide from the electro-swing sorbent material and the formation of an enriched gas within the release chamber.

2. The device of claim 1:

wherein each disk of the plurality of disks comprises at least one pair of electrical contacts on a top of the disk, and at least one pair of conductive posts on a bottom of the disk, each pair of electrical contacts communicatively coupled to the electro-swing sorbent material of the disk, each electrical contact communicatively coupled to a different conductive post and aligned such that when the capture structure is in the release configuration, the electrical contacts of a lower disk of a neighboring pair of disks is in direct conductive contact with the conductive posts of an upper disk of the neighboring pair; and wherein the sorbent regeneration system further comprises at least one pair of base electrical contacts beneath the plurality of disks, the at least one pair of base electrical contacts communicatively coupled to the power supply and positioned such that when the capture structure is in the release configuration, at least one pair of conductive posts of the plurality of disks is in direct conductive contact with at least one pair of base electrical contacts and the plurality of disks receives power from the power supply of the sorbent regeneration system.

3. The device of claim 1:

wherein each disk of the plurality of disks comprises at least two edge contacts communicatively coupled to the electro-swing sorbent material of that disk;

wherein the release chamber further comprises at least one pair of power rails having opposite polarity, the power rails communicatively coupled with the sorbent regeneration system and positioned such that when the plurality of disks is in the release configuration, each disk of the plurality of disks is in contact with the at least one pair of power rails through the at least two edge contacts such that the electro-swing sorbent material is communicatively coupled with the power supply of the sorbent regeneration system through the at least one pair of power rails.

4. The device of claim 3, wherein the at least one pair of power rails is coupled to the release chamber through a plurality of biasing elements, such that the power rails are biased toward the plurality of disks when the capture structure is in the release configuration and maintain contact with the edge contacts of the plurality of disks.

5. The device of claim 1:

wherein each disk of the plurality of disks further comprises a battery and a voltage controller, the voltage controller communicatively coupled to the battery and the electro-swing sorbent material of the disk; and wherein each battery of the plurality of disks receives power from the power supply of the sorbent regeneration system at least while the capture structure is in the release configuration.

6. The device of claim 1, wherein the electro-swing sorbent material of the plurality of disks is conductively coupled to the power supply of the release chamber while the capture structure is moving between the collection and release configurations, and wherein the plurality of disks are conductively coupled to the power supply of the release chamber through the at least one collapsible support.

7. The device of claim 1:

wherein each disk of the plurality of disks comprises a first segment having a first radius as measured from a centroid of the disk and defined as the disk at a radius less than the first radius, and a second segment having a second radius as measured from the centroid and defined as the disk at a radius less than the second radius but greater than the first radius, the first segment being electrically isolated from the second segment;

wherein the collection voltage is segmented, comprising a first segment voltage and a second segment voltage different from the first segment voltage; and wherein, for each disk in the plurality of disks, the collection voltage is established when the first segment voltage is established across the first segment at the same time the second segment voltage is established across the second segment, to manipulate the flow of carbon dioxide being sorbed into the electro-swing sorbent material while the capture structure is in the collection configuration.

8. The device of claim 1:

wherein each disk of the plurality of disks comprises a first segment having a first radius as measured from a centroid of the disk and defined as the disk at a radius less than the first radius, and a second segment having a second radius as measured from the centroid and defined as the disk at a radius less than the second radius but greater than the first radius, the first segment being electrically isolated from the second segment;

wherein the release voltage is segmented, comprising a third segment voltage and a fourth segment voltage different from the third segment voltage; and wherein, for each disk in the plurality of disks, the release voltage is established when the third segment voltage is established across the first segment at the same time the fourth segment voltage is established across the second segment, to manipulate the flow of carbon dioxide being released by the electro-swing sorbent material while the capture structure is in the release configuration.

9. The device of claim 1, wherein the sorbent regeneration system comprises a heat source.

10. The device of claim 9, wherein the heat source is a steam source.

11. The device of claim 1:

wherein each disk of the plurality of disks is substantially planar; and wherein, for each disk of the plurality of disks, the electro-swing sorbent material comprises a plurality of sorbent surfaces coupled to a surface of the disk at an angle greater than zero.

12. The device of claim 1, wherein each disk of the plurality of disks comprises an aperture.

13. A method for passive collection of atmospheric carbon dioxide, comprising:

preparing a passive collection device, comprising a release chamber and a capture structure, to collect atmospheric carbon dioxide by moving the capture structure into a collection configuration with an actuator driven by a control system, the capture structure comprising at least one collapsible support and a plurality of disks coupled to and spaced along the at least one collapsible support, each disk comprising an electro-swing sorbent material, the collection configuration comprising the capture structure extending upward from the release chamber while a collection voltage is established across the electro-swing sorbent material;

exposing at least a portion of the capture structure to an airflow to allow the electro-swing sorbent material of the plurality of disks to capture atmospheric carbon dioxide;

placing the capture structure in a release configuration by driving the actuator to lower the capture structure into the release chamber such that the at least one collapsible support collapses and the plurality of disks is entirely inside of the release chamber and conductively coupled to a power supply of a sorbent regeneration system such that plurality of disks can receive power;

closing the release chamber with a lid, confining the plurality of disks inside the release chamber;

regenerating the sorbent material of the plurality of disks by establishing a release voltage across the electro-swing sorbent material of each disk with the sorbent regeneration system, to release the captured carbon dioxide, forming an enriched gas within the release chamber; and emitting a product stream of enriched gas through a product outlet in fluid communication with the inside of the release chamber by displacing the enriched gas with a sweep gas introduced to the release chamber.

14. The method of claim 13, further comprising:

determining at least one ambient condition local to the passive collection device based on a signal received from at least one sensor communicatively coupled to the control system; and determining an optimal exposure time for the capture structure based on the at least one ambient condition.

15. The method of claim 13:

wherein each disk of the plurality of disks comprises at least one pair of electrical contacts on a top of the disk, and at least one pair of conductive posts on a bottom of the disk, each pair of electrical contacts communicatively coupled to the electro-swing sorbent material of the disk, each electrical contact communicatively coupled to a different conductive post and aligned such that when the capture structure is in the release configuration, the electrical contacts of a lower disk of a neighboring pair of disks is in direct conductive contact with the conductive posts of an upper disk of the neighboring pair;

wherein placing the capture structure in the release configuration further comprises placing at least one pair of conductive posts of the plurality of disks in direct conductive contact with at least one pair of base electrical contacts of the sorbent regeneration system, the base electrical contacts communicatively coupled to the power supply; and wherein establishing the release voltage across the electro-swing sorbent material of each disk comprises providing power to the plurality of disks with the power supply of the sorbent regeneration system.

16. The method of claim 13:

wherein each disk of the plurality of disks comprises at least two edge contacts communicatively coupled to the electro-swing sorbent material of that disk;

wherein the release chamber further comprises at least one pair of power rails having opposite polarity, the power rails communicatively coupled with the sorbent regeneration system;

wherein placing the capture structure in the release configuration further comprises placing every disk of the plurality of disks in contact with the at least one pair of power rails through the at least two edge contacts such that the electro-swing sorbent material is communicatively coupled with the sorbent regeneration system; and wherein establishing the release voltage across the electro-swing sorbent material of each disk comprises providing power to the plurality of disks with the power supply of the sorbent regeneration system through the at least one pair of power rails.

17. The method of claim 13, further comprising:

powering a battery and a voltage controller of each disk of the plurality of disks, the voltage controller communicatively coupled to the battery and the electro-swing sorbent material of the disk, using the sorbent regeneration system while the capture structure is in the release configuration;

wherein the collection voltage is established using power from the battery when the capture structure is in the collection configuration.

18. The method of claim 13, wherein the electro-swing sorbent material of the plurality of disks is conductively coupled to the power supply of the release chamber while the capture structure is moving between the collection and release configurations, and wherein the plurality of disks are conductively coupled to the power supply of the release chamber through the at least one collapsible support.

19. The method of claim 13:

wherein each disk of the plurality of disks comprises a first segment having a first radius as measured from a centroid of the disk and defined as the disk at a radius less than the first radius, and a second segment having a second radius as measured from the centroid and defined as the disk at a radius less than the second radius but greater than the first radius, the first segment being electrically isolated from the second segment;

wherein the collection voltage is segmented, comprising a first segment voltage and a second segment voltage different from the first segment voltage; and wherein, for each disk in the plurality of disks, establishing the collection voltage comprises establishing the first segment voltage across the first segment at the same time the second segment voltage is established across the second segment, to manipulate the flow of carbon dioxide being sorbed into the electro-swing sorbent material while the capture structure is in the collection configuration.

20. The method of claim 13:

wherein each disk of the plurality of disks comprises a first segment having a first radius as measured from a centroid of the disk and defined as the disk at a radius less than the first radius, and a second segment having a second radius as measured from the centroid and defined as the disk at a radius less than the second radius but greater than the first radius, the first segment being electrically isolated from the second segment;

wherein the release voltage is segmented, comprising a third segment voltage and a fourth segment voltage different from the third segment voltage; and wherein, for each disk in the plurality of disks, establishing the release voltage comprises establishing the third segment voltage across the first segment at the same time the fourth segment voltage is established across the second segment, to manipulate the flow of carbon dioxide being released by the electro-swing sorbent material while the capture structure is in the release configuration.

\*　\*　\*　\*　\*